(12) United States Patent
Kurata

(10) Patent No.: US 8,611,424 B2
(45) Date of Patent: Dec. 17, 2013

(54) IMAGE PROCESSING APPARATUS AND IMAGE PROCESSING METHOD

(75) Inventor: Tohru Kurata, Saitama (JP)

(73) Assignee: Sony Corporation, Tokyo (JP)

( * ) Notice: Subject to any disclaimer, the term of this patent is extended or adjusted under 35 U.S.C. 154(b) by 807 days.

(21) Appl. No.: 12/401,961

(22) Filed: Mar. 11, 2009

(65) Prior Publication Data

US 2009/0232216 A1 Sep. 17, 2009

(30) Foreign Application Priority Data

Mar. 13, 2008 (JP) ................................ 2008-063560

(51) Int. Cl.
*H04N 7/12* (2006.01)

(52) U.S. Cl.
USPC .................................................. 375/240.16

(58) Field of Classification Search
USPC ....................................... 375/240.01, 240.16
IPC ........................................................ H04N 7/12
See application file for complete search history.

(56) References Cited

U.S. PATENT DOCUMENTS

| 2007/0331169 | | 11/2000 | Han-Feng et al. | |
| 2002/0009144 | A1* | 1/2002 | Ishihara et al. | ........... 375/240.16 |
| 2005/0259739 | A1* | 11/2005 | Nakamura et al. | ........ 375/240.16 |
| 2007/0291843 | A1 | 12/2007 | Chappalli | |

FOREIGN PATENT DOCUMENTS

| EP | 1793346 | | 6/2007 |
| EP | 1793346 | A2 | 6/2007 |
| JP | 04-229795 | | 8/1992 |
| JP | 06-203164 | | 7/1994 |
| JP | 2000-331169 | | 11/2000 |
| JP | 2002-016836 | | 1/2003 |
| JP | 2005-057694 | | 3/2005 |
| JP | 2005-301984 | | 10/2005 |
| JP | 2006-318345 | | 11/2006 |
| JP | 2007-043651 | | 2/2007 |
| JP | 2003-078807 | | 3/2010 |
| WO | 01-74072 | | 10/2001 |
| WO | 01/74072 | A1 | 10/2001 |
| WO | 0174072 | | 10/2001 |
| WO | 2006-036829 | | 4/2006 |
| WO | 2008/036829 | A2 | 3/2008 |

OTHER PUBLICATIONS

Partial European Search Report (EP 09-00 3533) issued on Dec. 17, 2009.
Japanese Office Action for corresponding JP2008-063560 issued on Feb. 23, 2010.
European Search Report issued on Mar. 8, 2010, for corresponding EP 09 00 3533.
Chinese Office Action for corresponding Appln. Mo. 200910127128.3 issued on Jun. 30, 2010.

* cited by examiner

*Primary Examiner* — David Czekaj
*Assistant Examiner* — Tracy Li
(74) *Attorney, Agent, or Firm* — K&L Gates LLP

(57) ABSTRACT

The present application provides an image processing apparatus, including: a correlation value calculation section configured to determine a correlation value between a target block and a each of reference blocks; a section configured to determine a highest value from among the correlation values; a motion vector detection section configured to detect a motion vector of the target block; and a section configured to calculate an index to reliability of the motion vector detected by the motion vector detection section.

13 Claims, 23 Drawing Sheets

FIG.20

(EXPRESSION 3) AFFINE TRANSFORMATION $$\begin{bmatrix} v \\ w \end{bmatrix} = \begin{bmatrix} a & b & c \\ d & e & f \end{bmatrix} \begin{bmatrix} x \\ y \\ 1 \end{bmatrix} = \begin{bmatrix} a \cdot x + b \cdot y + c \\ d \cdot x + e \cdot y + f \end{bmatrix}$$

FIG.21

(EXPRESSION 4) APPLICATION 1 OF LEAST SQUARES METHOD TO AFFINE TRANSFORMATION $$V_n = \begin{bmatrix} a & b & c \\ d & e & f \end{bmatrix} \begin{bmatrix} x_n \\ y_n \\ 1 \end{bmatrix}$$

$$\varepsilon_n^2 = \left| V_n - \begin{bmatrix} v_n \\ w_n \end{bmatrix} \right|^2$$

$$\varepsilon^2 = \sum \varepsilon_n^2$$
$$= \sum \{ (a \cdot x_n + b \cdot y_n + c - v_n)^2 + (d \cdot x_n + e \cdot y_n + f - w_n)^2 \}$$

WHERE
$x_n$ = HORIZONTAL COMPONENT OF CENTER COORDINATE OF EACH BLOCK N
$y_n$ = VERTICAL COMPONENT OF CENTER COORDINATE OF EACH BLOCK N
$v_n$ = HORIZONTAL COMPONENT OF MOTION VECTOR OF EACH BLOCK n
$w_n$ = VERTICAL COMPONENT OF MOTION VECTOR OF EACH BLOCK n
$V_n$ = THEORETICAL VECTOR OF EACH BLOCK n DETERMINED FROM AFFINE TRANSFORMATION
$\varepsilon_n$ = ERROR (DISTANCE) OF MOTION VECTOR OF EACH BLOCK n FROM THEORETICAL VECTOR
$\varepsilon$ = SUM TOTAL OF $\varepsilon_n$

FIG.22

(EXPRESSION 5) APPLICATION 2 OF LEAST SQUARES METHOD TO AFFINE TRANSFORMATION

FROM $$\frac{\partial \varepsilon^2}{\partial a} = 0, \quad \frac{\partial \varepsilon^2}{\partial b} = 0, \quad \frac{\partial \varepsilon^2}{\partial c} = 0$$

$$a \cdot x2 + b \cdot xy + c \cdot x = vx \quad \cdots ①$$
$$a \cdot xy + b \cdot y2 + c \cdot y = vy \quad \cdots ②$$
$$a \cdot x + b \cdot y + c \cdot n = v \quad \cdots ③$$

WHERE

- n = SUM TOTAL OF BLOCKS
- x2 = $\sum x^2$
- xy = $\sum xy$
- y2 = $\sum y^2$
- x = $\sum x$
- y = $\sum y$
- vx = $\sum vx$
- vy = $\sum vy$
- v = $\sum v$

FIG.23

(EXPRESSION 6) APPLICATION 3 OF LEAST SQUARES METHOD TO AFFINE TRANSFORMATION FROM ①, ②, ③ OF (EXPRESSION 5)

$$a = \frac{(n \cdot y^2 - y^2)(n \cdot vx - v \cdot x) - (n \cdot xy - x \cdot y)(n \cdot vy - v \cdot y)}{(n \cdot x^2 - x^2)(n \cdot y^2 - y^2) - (n \cdot xy - x \cdot y)^2}$$

$$b = \frac{(n \cdot xy - x \cdot y)(n \cdot vx - v \cdot x) - (n \cdot x^2 - x^2)(n \cdot vy - v \cdot y)}{(n \cdot xy - x \cdot y)^2 - (n \cdot x^2 - x^2)(n \cdot y^2 - y^2)}$$

$$c = \frac{(x \cdot y^2 - xy \cdot y)(x \cdot vx - v \cdot x^2) - (xy \cdot x - x^2 \cdot y)(vy \cdot x - v \cdot xy)}{(n \cdot y^2 - xy \cdot y)(x^2 - n \cdot x^2) - (xy \cdot x - x^2 \cdot y)(x \cdot y - n \cdot xy)}$$

FIG.24

(EXPRESSION 7) APPLICATION 4 OF LEAST SQUARES METHOD TO AFFINE TRANSFORMATION $$d = \frac{(n \cdot y^2 - y^2)(n \cdot wx - w \cdot x) - (n \cdot xy - x \cdot y)(n \cdot wy - w \cdot y)}{(n \cdot x^2 - x^2)(n \cdot y^2 - y^2) - (n \cdot xy - x \cdot y)^2}$$

$$e = \frac{(n \cdot xy - x \cdot y)(n \cdot wx - w \cdot x) - (n \cdot x^2 - x^2)(n \cdot wy - w \cdot y)}{(n \cdot xy - x \cdot y)^2 - (n \cdot x^2 - x^2)(n \cdot y^2 - y^2)}$$

$$f = \frac{(x \cdot y^2 - xy \cdot y)(x \cdot wx - w \cdot x^2) - (xy \cdot x - x^2 \cdot y)(wy \cdot x - w \cdot xy)}{(n \cdot y^2 - xy \cdot y)(x^2 - n \cdot x^2) - (xy \cdot x - x^2 \cdot y)(x \cdot y - n \cdot xy)}$$

WHERE
  wx = Σwx
  wy = Σwy
  w = Σw

IMAGE PROCESSING APPARATUS AND IMAGE PROCESSING METHOD

CROSS REFERENCES TO RELATED APPLICATIONS

The present application claims priority to Japanese Patent Application JP 2008-063560, filed in the Japan Patent Office on Mar. 13, 2008, the entire contents of which being incorporated herein by reference.

BACKGROUND

The present application relates to an image processing apparatus and method by which a motion vector between two screen images is detected and the reliability of the detected motion vector is calculated.

A block matching technique which determines a motion vector between two screen images from image information itself is a technique of an old history.

According to the block matching technique, a motion vector between two screen images including a reference screen image which is a noticed screen image and an original image (hereinafter referred to as target screen image) from which a motion of the reference screen image originates is calculated by calculating a correlation between the reference screen image and the target screen image with regard to blocks of a rectangular region of a predetermined size (a target block and a reference block). The block matching technique includes two cases including a case wherein the target screen image precedes in time to the reference screen image as in the case of, for example, motion detection by the MPEG (Moving Picture Experts Group) system, and another case wherein the reference screen image precedes in time to the target screen image as in the case of, for example, noise reduction by superposition of image frames hereinafter described.

It is to be noted that, in the present specification, the term screen image signifies an image formed from image data of one frame or one field. However, for the convenience of description, in the following description of the present specification, it is assumed that one screen image is formed from one frame and is hereinafter referred to as frame. Accordingly, a reference screen image is hereinafter referred to as reference frame and a target screen image is hereinafter referred to as target frame.

A motion vector matching technique by the block matching has been developed particularly in regard to pan-tilt detection and image pickup object tracking of a television camera, moving picture coding of the MPEG (Moving Picture Experts Group) system and so forth. In the nineties, application over a wide range including sensorless camera shake correction by superposition of images, noise reduction upon image pickup in low illuminance and so forth has been promoted.

Further, the motion vector detection method by the block matching is applied not only for the image recognition applications and the camera shake correction applications but also for new applications like automatic adjustment of the shutter speed of an image pickup apparatus and double-speed frame rate conversion of a liquid crystal television set.

In any case, the reliability of a detected vector is significant. In particular, if the detected motion vector is accurate, then positioning of a plurality of images in a high degree of accuracy is possible and tracking of an image pickup object, highly accurate camera shake correction and so forth can be anticipated. However, if a motion vector of low reliability is used to execute a process, then correction or the like is carried out in an erroneous direction, and therefore, a situation that also the accuracy of an application-dependent post-processing step becomes low occurs.

Therefore, a method of extracting a motion vector of high reliability has been proposed and is disclosed, for example, in Japanese Patent Laid-Open No. 2006-318345. According to the method, comparison of AC components and a DC component of a result of discrete cosine transform (DCT) in encoding of the MPEG system is carried out or comparison with an edge of an image is carried out to detect a motion vector from a characteristic image portion as a motion vector having high reliability.

Also a method is available wherein, before vector calculation, characteristic points or singular points in an image are extracted in advance by edge detection or by a section of a corner detector, and a motion vector is determined from the characteristic points.

Further, it is disclosed in Japanese Patent Laid-Open No. 2005-301984 that an index to reliability of a motion vector is obtained from an activity representative of a characteristic amount of an image.

SUMMARY

However, the existing techniques relating to the reliability of a motion vector described above all require a process of extracting a characteristic point or a characteristic amount of an image and requires a provision of section configured to extract a characteristic point or a characteristic amount in addition to a detection process of a motion vector. Therefore, the existing techniques have a problem in that they are complicated in configuration and an increased cost is required.

Further, all of the above-described techniques which use a characteristic point or a characteristic amount are basically directed to a low-noise image and have a problem in that they do not function normally where a high-noise image is involved. Furthermore, the characteristic point extraction method has a problem in that it is not good at noise or at repeated patterns.

Therefore, it is desirable to provide an image processing apparatus and method by which, even where an image has high noise or includes repeated patterns, the reliability of a motion vector can be evaluated by a simple configuration.

According to an embodiment, there is provided an image processing apparatus including a correlation value calculation section configured to set a plurality of reference blocks having a size equal to that of a target block formed with a predetermined size in a target screen image and formed from a plurality of pixels within a search range set in a reference screen image different from the target screen image and determining a correlation value between the target block and each of the reference blocks, a section configured to determine the highest value from among the correlation values calculated by the correlation value calculation section and a maximum value from among the correlation values except the highest value, a motion vector detection section configured to detect a motion vector of the target block as a displacement amount of the reference block with regard to which the highest value of the correlation value is calculated from the target block, and a section configured to calculate the difference between the highest value of the correlation value and the maximum value of the correlation values except the highest value as an index to reliability of the motion vector detected by the motion vector detection section.

According to another embodiment, there is provided an image processing apparatus including a correlation value calculation section configured to set a plurality of reference blocks having a size equal to that of a target block formed with a predetermined size in a target screen image and formed from a plurality of pixels within a search range set in a reference screen image different from the target screen image and determining a correlation value between the target block and each of the reference blocks, a section configure to determine the highest value from among the correlation values calculated by the correlation value calculation section and a maximum value from among the correlation values except the highest value, a motion vector detection section configured to detect a motion vector of the target block as a displacement amount of the reference block with regard to which the highest value of the correlation value is calculated from the target block, and a section configured to calculate the ratio between the highest value of the correlation value and the maximum value of the correlation values except the highest value as an index to reliability of the motion vector detected by the motion vector detection section.

For example, where the target screen image and the reference screen images are still images, if an ideal state wherein no noise exists is assumed, then when the correlation value between each of a plurality of reference blocks within a search range and a target block is determined, it is considered that the correlation values include only one maximum value, which is equal to the highest value among the correlation values.

However, in the case of an actual image such as, for example, a picked up image, a target screen image and reference screen images generally include a plurality of maximum values of the correlation value because of an influence of a light amount variation, a movement of a moving object and so forth and also of various kinds of noise even where the screen images are still images.

Then, although a motion vector is detected based on the position of that reference block which exhibits a first maximum value of the correlation value which is the highest value among the correlation values, if the difference between the first maximum value of the correlation value and another maximum value among the correlation values except the first maximum value of the correction value, that is, a second maximum value of the correlation value, is small, then it is questionable which one of the two maximum values is correct. Therefore, the reliability is low.

On the other hand, if the difference between the first and second maximum values of the correlation value is great, then it is considered that the reliability of the motion vector determined from the first maximum value of the correlation value is comparatively high.

Where the target screen image and the reference screen images are, for example, moving picture images, the correlation values seldom include only the first maximum value because of a moving image portion. Besides, as regards a movement in a unit of a block, if the difference between the second maximum value of the correlation value and the first maximum value of the correlation value is small, then since it is questionable which one of the maximum values is correct, the reliability is low. On the other hand, if the difference between the first maximum value of the correlation value and the second maximum value of the correlation value is great, then it is considered that the reliability of the motion vector determined from the first maximum value of the correlation value is comparatively high.

From the foregoing, according to a first embodiment, the difference between the first maximum value of the correlation value, that is, the maximum value among the correlation values, and the second maximum value of the correlation value is used as an index to the reliability of the motion vector.

In the meantime, according to the second embodiment, the ratio between the first maximum value of the correlation value, that is, the highest value among the correlation values, and the second maximum value of the correlation value is used as an index to the reliability of the motion vector.

Even if noise is included in the first maximum value or highest value of the correlation value and the second maximum value of the correlation value, if the difference between the first maximum value or highest value and the second maximum value or the ratio between the first maximum value or highest value and the second maximum value is determined, then the noise components cancel each other and the influence of the noise decreases. Therefore, the index to reliability of the motion vector is highly reliable.

With the image processing apparatus and method, an index representative of reliability of a motion vector can be obtained only using correlation values between a target block and reference blocks without using a characteristic point or a characteristic amount of an image. Therefore, an index to reliability of a motion vector having high reliability can be obtained also with regard to an image including much noise or a repeated pattern.

Additional features and advantages are described herein, and will be apparent from the following Detailed Description and the figures.

BRIEF DESCRIPTION OF THE FIGURES

FIGS. 20 to 24 are views illustrating expressions which represent examples of processing of determining a global motion vector from local motion vectors by the image processing method;

DETAILED DESCRIPTION

Figure 1:
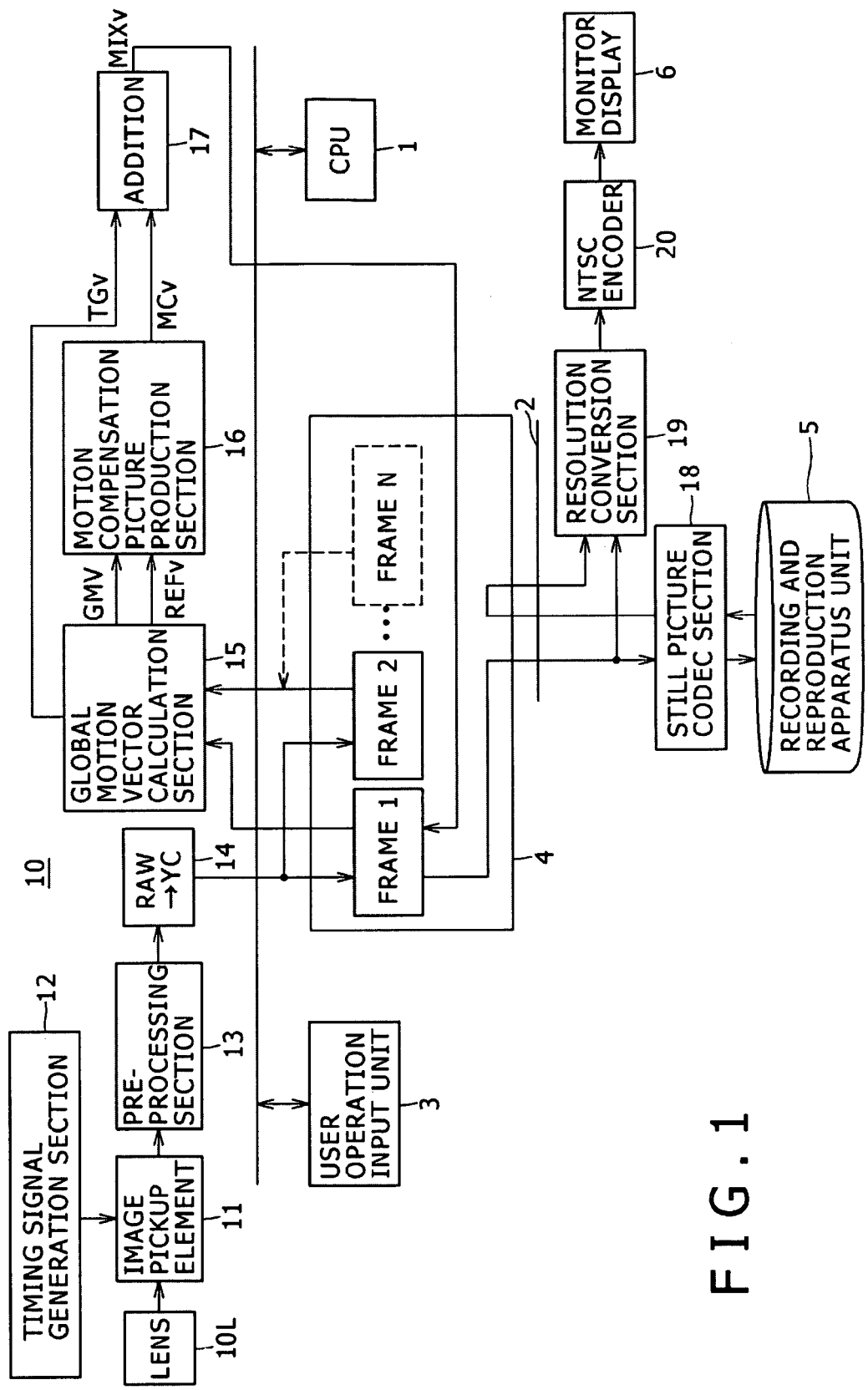
FIG. 1 is a block diagram showing an example of a configuration of an image pickup apparatus to which an image processing apparatus according to a preferred embodiment.

In the following, an image pickup apparatus to which an image processing apparatus and an image processing method according to an embodiment will now be described in reference to the accompanying drawings.

First Embodiment

An image pickup apparatus according to a first embodiment is configured such that it positions and superposes a plurality of still images picked up by an image pickup device or imager to carry out noise reduction of an image.

In an environment wherein an image pickup apparatus is held by a hand to pick up an image, camera shake is likely to occur. Upon such image pickup by an image pickup apparatus held by a hand, where still images are picked up consecutively, the first picked up still image is referred to as target frame and the second and succeeding picked up still images are referred to as reference frames. Where a reference frame is positioned to the position of the target frame by applying a transformation process including parallel movement, rotation and expansion or reduction to the entire reference frame, the transformation process applied to the entire reference frame is referred to as global motion. Camera shake signifies that a global motion occurs with a target frame by an amount by which the reference frame can be positioned to the target frame by applying a transformation process including parallel movement, rotation and expansion or reduction to the target frame.

In the present embodiment, while the first picked up still picture is used as a reference, that is, as a target frame, for the simplified description, this is not essential. An arbitrary nth target frame may be used as a target frame while an arbitrary mth (n≠m) still image is set as a reference frame to re-define a global motion. Or a global motion may be defined with regard to two frame images which are different in time in moving pictures. Or else, a process of a global motion may be applied not to an entire effective picture framework from within one frame of a picked up image but to only part of an image of one frame.

A global motion corresponds to a motion vector (hereinafter referred to as global motion vector) of a unit of a screen image between a target frame and a reference frame. Accordingly, if a global motion vector can be determined accurately, then a global motion can be derived correctly and camera shake can be corrected appropriately.

In the following description, to use motion vector detection and motion compensation (wherein a motion vector is used to superpose two images of different frames to carry out positioning of the images) to reduce noise is hereinafter referred to as noise reduction (NR), and an image whose noise is reduced by the noise reduction is hereinafter referred to as reduced noise image.

In the present embodiment, a motion vector is detected by the block matching method described hereinabove. Further, in the present embodiment, one screen image is divided into a large number of blocks, and a motion vector in a unit of a block (such motion vector is hereinafter referred to as local motion vector) is detected by the block matching method. Further, an index to reliability of the local motion vector is detected in such a manner as hereinafter described using a correlation value in the block matching method. Then, a global motion vector as a motion vector in a unit of one screen image is detected only from those of such detected local motion vectors which have high reliability.

Outline of the Block Matching

Figure 2A:
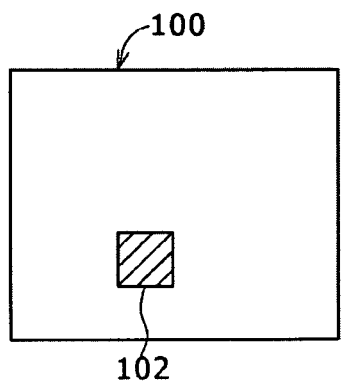
FIGS. 2A, 2B and 3 to 10 are schematic diagrammatic views illustrating a block matching process by the image processing apparatus.

FIGS. 2A to 7 illustrate an outline of the block matching method. In the block matching method described here, a block, that is, a target block 102, of a rectangular region of a predetermined size including a plurality of pixels in a horizontal direction and a plurality of lines in a vertical direction is assumed in the target frame 100 as seen in FIG. 2A.

In the block matching, a block having a high correlation to the target block 102 is searched out from within a reference frame 101. A reference block 103 shown in FIG. 2B detected as a block having the highest correlation with the target block 102 from within the reference frame 101 is hereinafter referred to as motion compensation block. Further, the positional displacement amount between the target block 102 and the motion compensation block 103 which has the highest correction with the target block 102 is hereinafter referred to as motion vector (refer to reference numeral 104 of FIG. 2B).

The motion vector 104 corresponding to the positional displacement, which includes a positional displacement amount and a positional displacement direction, between the target block 102 and the motion compensation block 103 corresponds, where a projection image block 109 of the target block 102 is assumed at a position of the reference frame 101 same as the position of the target block 102 of the target frame 100, to the positional displacement between the position, for example, the position of the center, of the projection image block 109 of the target block 102 and the position, for example, the position of the center, of the motion compensation block 103. Thus, the motion vector 104 has a positional displacement and a directional component.

Figure 3:
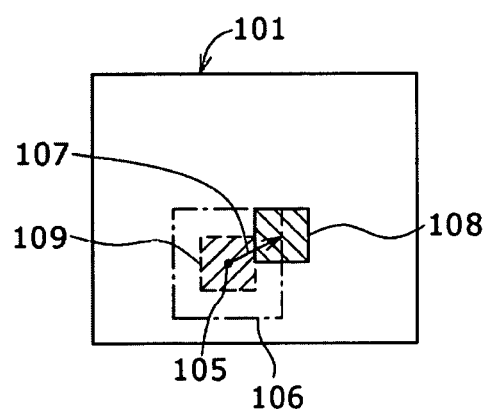

An outline of the block matching process is described. Referring to FIG. 3, the projection image block 109 of the target block 102 of the target frame 100 is assumed at a position of the reference frame 101 which is same as the position of the target block 102 of the target frame 100, and the coordinate of the center of the projection image block 109 of the target block is determined as the origin 105 for motion detection. Then, it is assumed that the motion vector 104 exists within a certain range from the origin 105, and a predetermined range centered at the origin 105 is set as a search range 106 indicated by an alternate long and short dash line in FIG. 3.

Then, a block, that is, a projection image block 109, of the same size as that of the target block 102 is set on the reference screen image. Then, the position of a reference block 108 is moved in a unit of one pixel or a plurality of pixels, for example, in the horizontal direction and the vertical direction within the search range 106. Accordingly, a plurality of reference blocks 108 are set in the search range 106.

Here, that the reference block 108 is moved within the search range 106 signifies that, since the origin 105 in the present example is the position of the center of the target block, the position of the center of the reference block 108 is moved within the search range 106, and pixels which compose the reference block 108 may protrude from the search range 106.

Then, with regard to each reference block 108 set in the search range 106, a vector, that is, a reference vector 107 (refer to FIG. 7), representative of a positional displacement amount and a positional displacement direction of the reference block 108 and the target block 102 is set. Then, a correlation between the image contents of the reference block 108 at the position indicated by each of such reference vectors 107 and the image contents of the target block 102 is evaluated.

Figure 4:
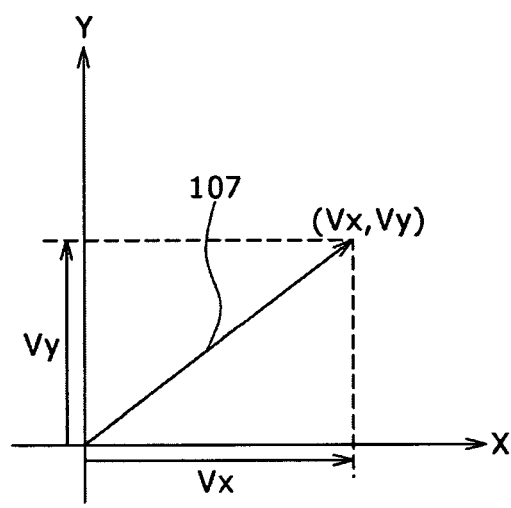

Referring to FIG. 4, the reference vector 107 can be represented as vector (Vx, Vy) where Vx is the positional displacement amount of the reference block 108 in the horizontal direction, that is, in the X direction and Vy is the positional displacement amount of the reference block 108 in the vertical direction, that is, in the Y direction. If the coordinate of the position, for example, the coordinate of the position of the center, of the reference block 108 and the coordinate of the position, for example, the coordinate of the position of the center, of the target block 102 are same, then the reference vector 107 is represented as vector (0, 0).

For example, if the reference block 108 is at a position displaced by a one-pixel distance in the X direction from the position of the target block 102, then the reference vector 107 is represented as vector (1, 0). Meanwhile, if the reference block 108 is at a position displaced by a three-pixel distance in the X direction and a two-pixel distance in the Y direction from the position of the target block 102, then the reference vector 107 is vector (3, 2).

Figure 5:
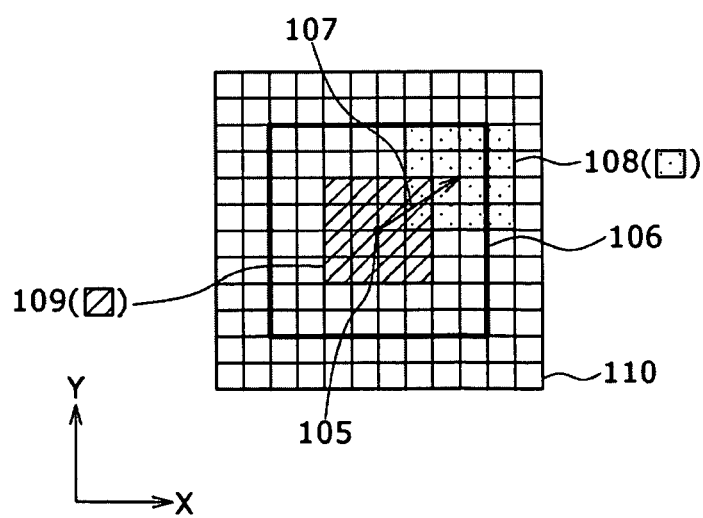

In short, where the positions of the target block 102 and each reference block 108 are given as the positions of the centers of the blocks as seen in FIG. 5, the reference vector 107 signifies a positional displacement, which is a vector including a positional displacement amount and a direction of the positional displacement, between the position of the center of the reference block 108 and the position of the center of the reference vector 107.

The reference block 108 moves within the search range 106, and in this instance, the position of the center of the reference block 108 moves within the search range 106. Since the reference block 108 includes a plurality of pixels in the horizontal direction and the vertical direction as described hereinabove, the maximum range of the movement of the reference block 108 which is an object of the block matching process with the target block 102 is given as a matching processing range 110 which is wider than the search range 106 as seen in FIG. 5.

Figure 2B:
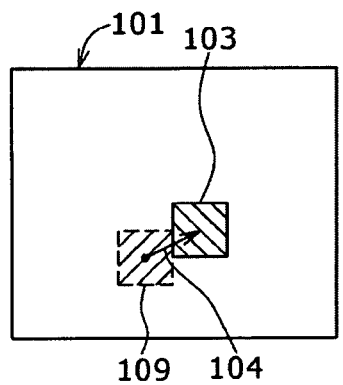

Then, the position of the reference block 108 detected as a block having the highest correlation with the image contents of the target block 102 is detected as the position of the target block 102 of the target frame 100 on the reference frame 101, that is, as the position after the movement. Then the detected reference block is determined as the motion compensation block 103 described hereinabove. Then, the positional displacement amount between the position of the detected motion compensation block 103 and the position of the target block 102 is detected as the motion vector 104 including a directional component as seen in FIG. 2B.

The correlation value representative of the degree of correlation between the target block 102 and the reference block 108 which moves within the search range 106 is calculated basically using corresponding pixel values of the target block 102 and the reference block 108. Various calculation methods including a method which uses the root mean square are available for the calculation of the correlation value.

Figure 6:
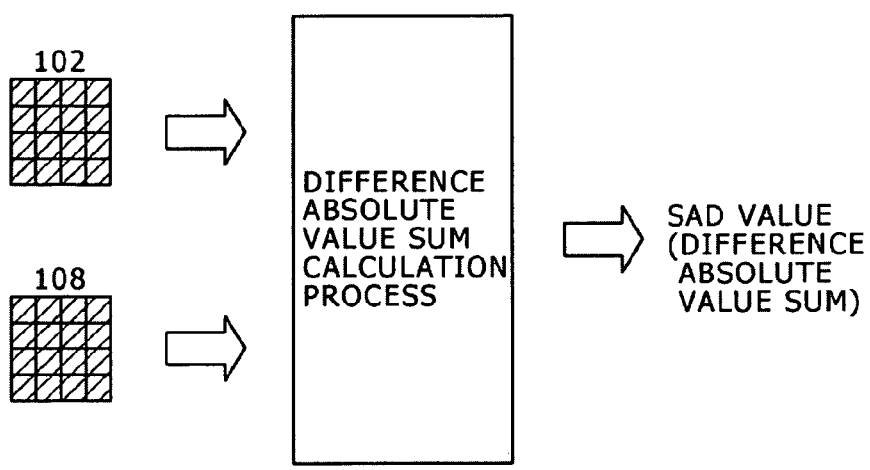

One of correlation values which are used popularly upon calculation of a motion vector is, for example, the sum total of the absolute value of the difference between the luminance value of each pixel in the target block 102 and the luminance value of the corresponding pixel in the search range 106 with regard to all pixels in the blocks as seen in FIG. 6. The sum total of absolute values of the differences is called difference absolute value sum and hereinafter referred to as SAD (Sum of Absolute Difference) value.

Where the SAD value is used as the correlation value, as the SAD value decreases, the correlation increases. Accordingly, from among the reference blocks 108 moved within the search range 106, the reference block 108 at a position at which the SAD value is lowest is the highest correlation reference block which has the highest correlation, and this highest correlation reference block is detected as the motion compensation block 103. Then, the positional displacement amount of the position of the detected motion compensation block 103 from that of the target block 102 is detected as the motion vector.

As described hereinabove, in the block matching, the positional displacement amount of each of a plurality of reference blocks 108 set within the search range 106 from the position of the target block 102 is represented by the reference vector 107 as an amount which includes a directional component. The reference vector 107 of each reference block 108 has a value corresponding to the position of the reference block 108 on the target block 102. As described hereinabove, in the block matching, the reference vector of the reference block 108 whose SAD value as a correlation value is the lowest is detected as the motion vector 104.

Figure 7:
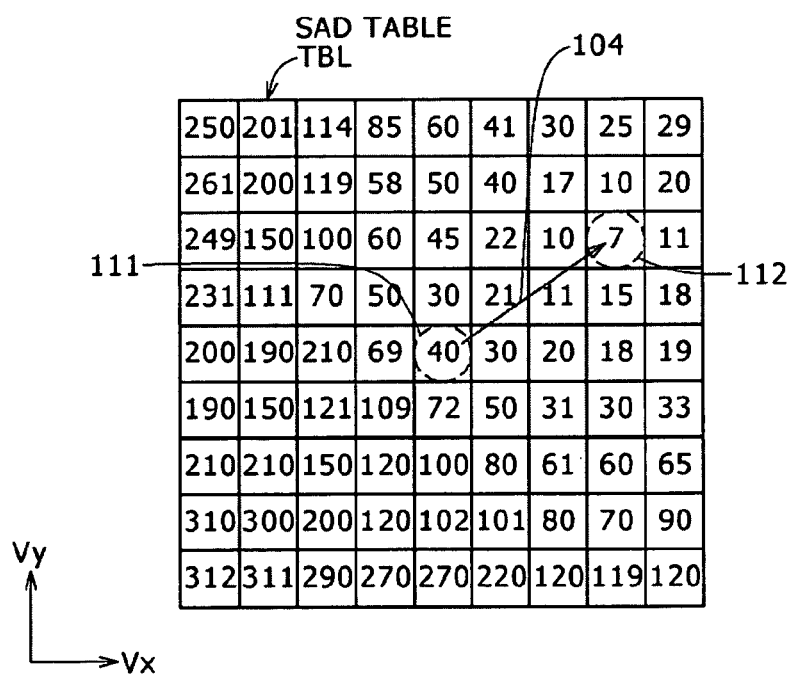

Thus, in the block matching, the motion vector 104 is detected generally as shown in FIG. 7. In particular, the SAD value between each of a plurality of reference blocks 108 set within the search range 106 and the target block 102 (such SAD value is hereinafter referred to as SAD value of the reference block 108 for simplified description) is stored in a memory in advance in a corresponding relationship to the reference vector 107 corresponding to the position of the reference block 108 (the reference vector 107 corresponding to the position of the reference block 108 is hereinafter referred to as reference vector 107 of the reference block 108 for simplified description). Then, the reference block 108 having the lowest one of the SAD values of all of the reference blocks 108 stored in the memory is detected to detect the motion vector 104.

The correlation values, in the example described, the SAD values, of a plurality of reference blocks 108, which are set in the search range 106, stored corresponding to the reference vectors 107 corresponding to the positions of the reference blocks 108 are referred to as correlation value table. In the example described, since a SAD value which is a difference absolute value sum is used as a correlation value, the correlation value table is referred to as difference absolute value sum table or SAD table.

This is indicated as SAD table TBL in FIG. 7. Referring to FIG. 7, in the SAD table TBL shown, a correlation value, in the example illustrated, a SAD value, of each reference block 108 is referred to as correlation value table element. In the example of FIG. 7, the SAD value indicated by reference numeral 111 is a SAD value when the reference vector is the vector (0, 0). Further, in the example of FIG. 7, since the lowest value of the SAD value is "7" when the reference vector is a vector (3, 2), the determined motion vector 104 is the vector (3, 2).

It is to be noted that the positions of the target block 102 and a reference block 108 signify arbitrary particular positions such as, for example, the positions of the centers, of the blocks. Further, a reference vector 107 indicates the displacement amount (including the direction) between the position of the projection image block 109 of the target block 102 of the reference frame 101 and the position of the reference block 108.

Since the reference vector 107 corresponding to each reference block 108 is a positional displacement of the reference block 108 from the position of the projection image block 109 corresponding to the target block 102 on the reference frame 101, if the position of the reference block 108 is specified, then also the value of the reference vector is specified corresponding to the position. Accordingly, the address of a correlation value table element of the reference block in the memory of the matching processing range 110 is specified, then a corresponding reference vector is specified.

It is to be noted that such SAD values may be calculated in parallel with regard to two or more target blocks. If the number of target blocks to be processed simultaneously increases, then the processing speed increases. However, since the scale of the hardware for calculating the SAD values increases, the increase of the speed of the processing and the increase of the circuit scale have a trade-off relationship.

Block Matching of the Embodiment

The foregoing description of the block matching relates to calculation of a motion vector of one target block. Since the rate at which the target block occupies in the target frame usually is low, it is normally difficult to determine the motion vector as it is as a global motion vector.

Figure 8:
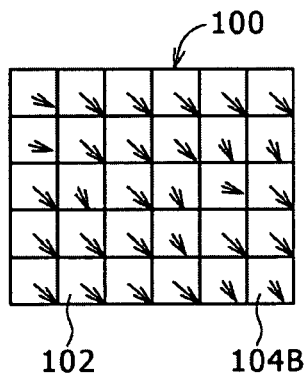

In the present embodiment, as shown in FIG. 8, the target frame 100 is divided into a plurality of target blocks 102 of a size of, for example, 64 pixels×64 lines, and a motion vector or local motion vector 104B of each of the target blocks is determined. At this time, in the present embodiment, an index representative of the reliability of each of the determined local motion vectors is calculated together.

Then, based on the indexes to the reliability of the local motion vectors, only those of the local motion vectors determined with regard to the target frame which have high reliability are extracted, and the global motion vector is calculated only from the extracted local motion vectors having high reliability. Then, the calculated global motion vector is used to carry out positioning of the reference frame to the target frame, and then the two frames positioned in this manner are superposed to produce a reduced noise image.

Figure 9:
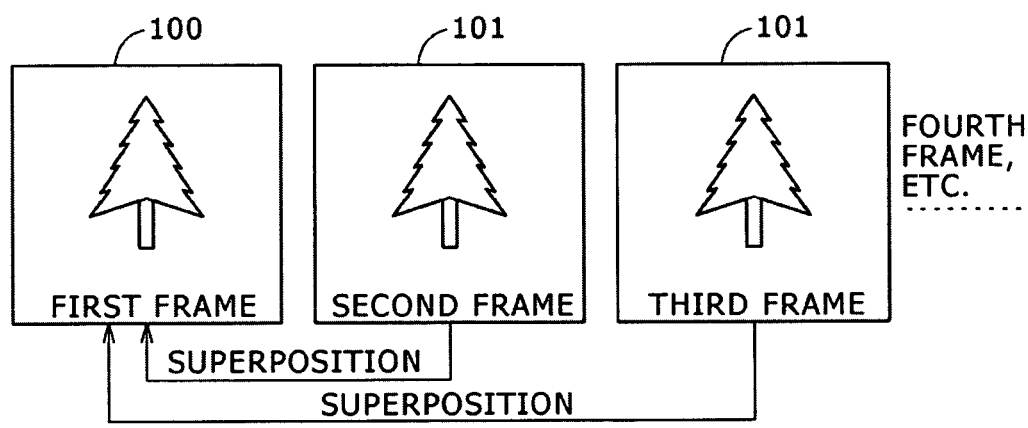
Figure 10:
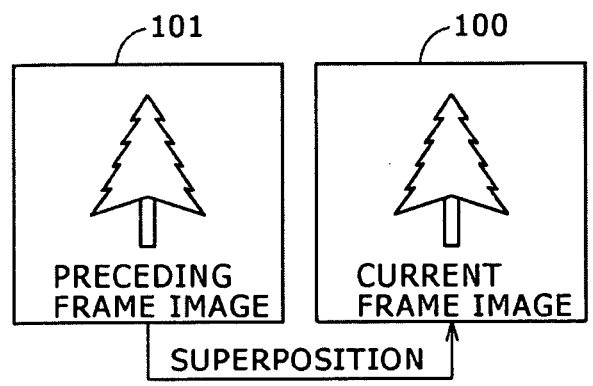

Then, the image pickup apparatus picks up, upon still picture image pickup, a plurality of still images as seen in FIG. 9 at a high speed, determines the first still picture picked up image as a target frame 100 and determines a predetermined number of still picture picked up images including the second and succeeding still picture picked up images as reference frames 101. Then, the image pickup apparatus carries out superposition using the target frame 100 and the reference frames 101 and records a resulting image of the superposition as a still picture picked up image. In particular, if the image pickup person depresses the shutter button of the image pickup apparatus, then the predetermined number of still images are picked up at a high speed. Then, on the still image (frame) picked up first, a plurality of still images (frames) picked up later in time are superposed and recorded.

It is to be noted that, though not described in the description of the present embodiment, upon moving picture image pickup, an image of a current frame currently outputted from the image pickup element is determined as an image of the target frame 100, and images in the past of preceding frames are determined as images of the reference frames 101. In other words, upon moving picture image pickup, in order to carry out noise reduction of an image of the current frame, images of preceding frames to the current frame are supposed on the current frame.

Example of the Hardware Configuration of the Image Pickup Apparatus

FIG. 1 shows an example of an image pickup apparatus as an image processing apparatus according to an embodiment.

Referring to FIG. 1, the image pickup apparatus shown includes a central processing unit (CPU) 1 connected to a system bus 2, and further includes a pickup image signal processing system 10, a user operation inputting unit 3, an image memory unit 4 and a recording and reproduction apparatus unit 5 connected to the system bus 2. It is to be noted that, though not shown in FIG. 1, the CPU 1 includes a ROM (Read Only Memory) in which a program for carrying out various software processes is stored, a RAM (Random Access Memory) for a working area and so forth.

The image pickup signal processing system 10 of the image pickup apparatus of FIG. 1 carries out such a recording process of picked up image data as hereinafter described in response to an image pickup recording starting operation through the user operation inputting unit 3. Further, the pickup image signal processing system 10 carries out a reproduction process of picked up image data recorded on a recording medium of the recording and reproduction apparatus unit 5 in response to a reproduction starting operation of picked up recorded images through the user operation inputting unit 3.

In the pickup image signal processing system 10, incident light from an image pickup object received through a camera optical system not shown including an image pickup lens 10L is irradiated upon an image pickup element 11 to pick up an image. In the present embodiment, the image pickup element 11 is formed from a CCD (Charge Coupled Device) imager. It is to be noted that the image pickup element 11 may otherwise be formed from a CMOS (Complementary Metal Oxide Semiconductor) imager.

In the image pickup apparatus, if an image pickup recording starting operation is carried out, then an image inputted through the image pickup lens 10L is converted into a pickup image signal by the image pickup element 11. Then, an analog pickup image signal in the form of a raw signal of a bayer array formed from three primary colors of red (R), green (G) and blue (B) is outputted as a signal synchronized with a timing signal from a timing signal generation section 12. The outputted analog pickup image signal is supplied to a pre-processing section 13, by which pre-processes such as correlation of defects and y correlation are carried out, and a resulting analog image signal is supplied to a data conversion section 14.

The data conversion section 14 converts the analog pickup image signal in the form of a raw signal inputted thereto into a digital pickup image signal or YC data composed of a luminance signal component Y and color difference signal components Cb/Cr. The digital pickup image signal from the data conversion section 14 is written into the image memory unit 4 in accordance with an image pickup instruction received through the user operation inputting unit 3.

In particular, if the image pickup instruction received through the user operation inputting unit 3 is a still picture pickup instruction originating from depression of the shutter button, then the digital pickup image signal from the data conversion section 14 is written into the image memory unit 4 such that a plurality of frames to be superposed on each other as described hereinabove are written into first to Nth frame memories 41 to 4N (N is the number of still pictures to be superposed) of the image memory unit 4.

In the present embodiment, image data of the first frame upon depression of the shutter button is written as image data of a target frame into the first frame memory 41. Then, data of the second and succeeding frame images are successively written as image data of reference frames into the second to Nth frame memories 42 to 4N.

After the plural images of different frames are written into the image memory unit 4, the image data of the target frame and the image data of the reference frames are read in by the global motion vector calculation block 15, and such a block matching process as hereinafter described is carried out to carry out detection of local motion vectors LMV, calculation of the reliability of the local motion vectors LMV and calculation of a global motion vector GMV.

In the present embodiment, the global motion vector calculation section 15 outputs information of the global motion vector GMV, image data TGv of the target frame and image data REFv of the reference frames.

The information of the global motion vector GVM and the image data REFv of the reference frames from the global motion vector calculation section 15 are supplied to a motion compensation production section 16. The motion compensation production section 16 applies processing corresponding to a global motion, that is, a transformation process including parallel movement, rotation and expansion or contraction, based on the global motion vector GVM to the image data REFv of the reference frames to produce a motion compensation image.

Then, the image data TGv of the target frame from the global motion vector calculation section 15 is supplied to an addition section 17, and image data MCv of the motion compensation image from the motion compensation production section 16 is supplied to the addition section 17. The addition section 17 adds the pixels at corresponding positions of the image data TGv and MCv to carry out a superposition process of the images, and outputs image data MIXv of a resulting sum image which is a reduced noise image.

The image data MIXv of the sum image from the addition section 17 is overwritten as image data of the target frame on image data of the preceding target frame into the first frame memory 41 of the image memory unit 4.

In particular, the image data of the target frame of the first frame memory 41 first is the image data of the first frame immediately after the shutter button is depressed. However, if the image data MCv of the motion compensation image of the second frame as a reference frame and the target frame are added, then the image data of the target frame of the first frame memory 41 is rewritten into the image data MIXv of the sum image of the result of the addition. Then, the image data MIXv of the sum image is used as image data of the target frame for the image data of the third frame as a reference frame. Then, the global motion vector GVM is calculated similarly as described above by the global motion vector calculation block 15, and an image superposition process is carried out by the addition section 17. Then, the image data MIXv of the sum image of the result of the addition is overwritten as image data of the target frame on the image data of the preceding target frame into the first frame memory 41 of the image memory unit 4. Thereafter, similar processing operation is carried out also for each of the fourth and succeeding frames as a reference image.

Accordingly, after the superposition process of the image up to the Nth image as a reference image is carried out, a reduced noise image wherein all of the N frames to be superposed are superposed is written in the first frame memory 41 of the image memory unit 4.

Then, the image data MIXv of the sum image as a reduced noise image of the result of the superposition stored in the first frame memory 41 of the image memory unit 4 is supplied to a still picture codec section 18 through the system bus 2, codec converted by the still picture codec section 18 and recorded on the recording medium such as, for example, a DVD (Digital Versatile Disc) or a hard disk of the recording and reproduction apparatus unit 5. In the present embodiment, the still picture codec section 18 carries out an image compression coding process for a still picture in accordance with the JPEG (Joint Photographic Experts Group) system.

Further, in the still picture image pickup mode, before the shutter button is depressed, image data from the data conversion section 14 is supplied to a resolution conversion section 19 through the first frame memory 41 of the image memory unit 4 and converted into data of a predetermined resolution by the resolution conversion section 19. Then, the resulting image data is supplied to a NTSC (National Television System Committee) encoder 20, by which it is converted into a standard color image signal of the NTSC system. Then, the resulting standard color image signal is supplied to a monitor display unit 6 which may be formed, for example, from an LCD (Liquid Crystal Display) panel, and a monitor image in the still picture image pickup mode is displayed on the display screen of the monitor display unit 6.

The image data of the still pictures recorded on the recording medium of the recording and reproduction apparatus unit 5 are read out in response to a reproduction starting operation through the user operation inputting unit 3 and supplied to the still picture codec section 18, by which they are decoded for reproduction. Then, the image data of a still picture decoded for reproduction is supplied to the NTSC encoder 20 through a buffer memory not shown of the image memory unit 4 and converted into a standard color image signal of the NTSC system by the NTSC encoder 20. Then, the standard color image signal is supplied to the monitor display unit 6, and a reproduction image thereof is displayed on the display screen of the monitor display unit 6.

It is to be noted that, though not shown in FIG. 1, an output image signal from the NTSC encoder 20 can be derived to the outside through an image output terminal.

It is to be noted that, while, in the present embodiment, image data is recorded in a compressed form by the still picture codec section 18, the still picture codec section 18 may be omitted such that the image data is recorded but not in a compressed form.

Further, it is possible to form the global motion vector calculation section 15 and the motion compensation production section 16 described above from hardware or using a DSP (Digital Signal Processor). Further, the global motion vector calculation section 15 and the motion compensation production section 16 may be replaced by software processing by the CPU 1.

Similarly, it is possible to form the addition section 17 from hardware or using a DSP. Further, the addition section 17 may be replaced by software processing by the CPU 1. This similarly applied also to the still picture codec section 18.

Global Motion Vector Calculation Block 15

In the present embodiment, the global motion vector calculation section 15 basically carries out a block matching process using SAD values described hereinabove with reference to FIGS. 2A to 7 to carry out local motion vector detection. It is to be noted, however, that, in the present embodiment, the global motion vector calculation section 15 is formed from such hardware as hereinafter described, and a local motion vector is calculated by a layered block matching process and an interpolation process. Further, as described hereinabove, the global motion vector calculation section 15 calculates also an index to reliability of each of local motion vectors.

Layered Block Matching Process

In a popular motion vector detection process in existing block matching, a reference block is moved in a unit of a pixel, that is, in a unit of one pixel or in a unit of a plurality of pixels, within a search range, and a SAD value of the reference block at each moved position is calculated. Then, a SAD value which indicates the lowest value from among the SAD values calculated in this manner is detected, and a motion vector is detected based on the reference block position which indicates the lowest SAD value.

Further, in the present embodiment, since one frame is divided into a large number of blocks, the block matching process described above is carried out for the entire screen image by successively changing over the target block and the reference block to carry out calculation of local motion vectors LMV of all target blocks in the target frame.

However, such an existing motion vector detection process as described above has a problem in that, since a reference block is moved in a unit of a pixel within a search range, the number of times of the matching process for calculating the SAD value increases to increase the matching process time and also the capacity of the SAD table increases in proportion to the search range. This problem is significant particularly if it is taken into consideration that increase of the number of pixels of a still image and enhancement of the definition (higher definition) of moving pictures advance and the size of one image becomes very great. The existing motion vector detection process further has a problem in that the number of times by which the image memory is accessed through the system bus 2 increases and the bus band must be increased.

Taking the foregoing into consideration, in the present embodiment, the layered block matching is carried out wherein a target image or target frame and a reference image or reference frame are reduced in size first to prepare reduced images and intermediate images and then a motion vector search by block matching is carried out in order of the reduced images, intermediate images and original images while reflecting a result of the block matching at the preceding stage on the search at the next stage. By carrying out the layered block matching, calculation of local motion vectors is carried out efficiently with a comparatively small amount of calculation and processing.

Figure 11:
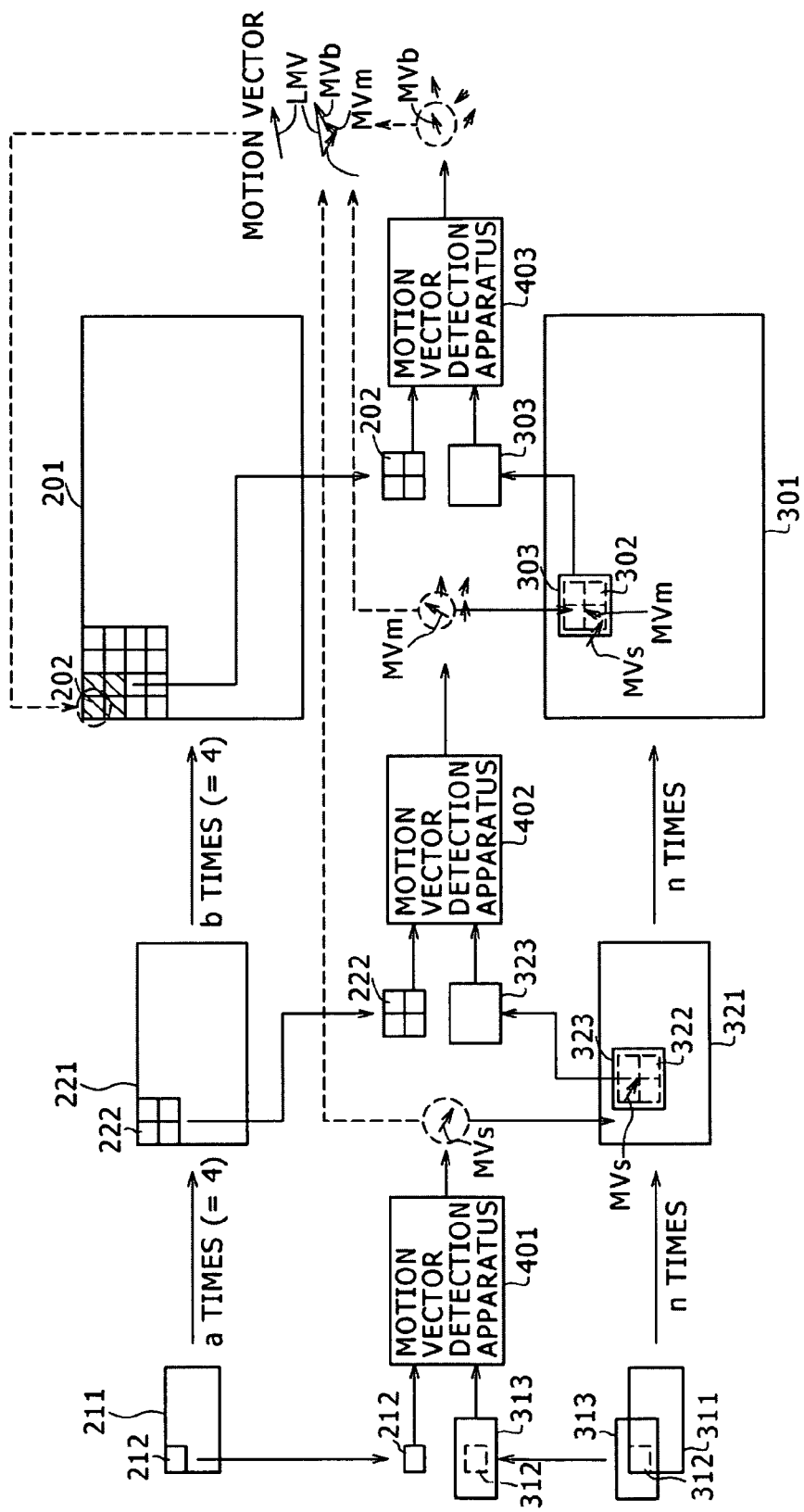
FIG. 11 is a block diagram illustrating the block matching process by the image processing apparatus.

FIG. 11 illustrates the layered block matching. Referring to FIG. 11, in the example illustrated, a base plane target frame 201 and a base plane reference frame 301 are reduced in size to 1/a·1/b (1/a and 1/b are reduction ratios and a>1 and b>1) to produce a reduction plane target frame 211 and a reduction plane reference frame 311, respectively. Then, the base plane target frame 201 and the base plane reference frame 301 are reduced to 1/b to produce an intermediate plane target frame 221 and an intermediate plane reference frame 321, respectively.

Although arbitrary scales can be used for the reduction plane and the intermediate plane with respect to the base plane, they may be suitably set to ½ to ⅛ time, that is, ¼ to 1/64 time as converted into a pixel number. It is to be noted that, in the example of FIG. 11, the reduction ratio of the reduction plane to the intermediate plane is ¼, that is, a=4, and the reduction ratio of the intermediate plane to the base plane is ¼, that is, b=4.

Also for production of the reduction plane and the intermediate plane, an arbitrary method may be applied. However, if a method wherein pixels of an original image are merely sampled out in response to a reduction ratio to produce a reduction plane or an intermediate plane is applied, then reflection components are generated and a motion vector which is detected in the first layer (reduction plane) becomes likely to be displaced from a correct motion vector. Therefore, usually a low-pass filter having a cutoff frequency band suitable for a reduction ratio is applied to an original image first, and then the sampling suitable for the reduction ratio is carried out.

In the present embodiment, a luminance average value is calculated among pixels including those pixels which disappear by sampling in accordance with a scale and is used as a reduction plane pixel or an intermediate plane pixel. In particular, in the case of 1/a reduction, a luminance average value in a square region of a×a pixels is calculated and used as a luminance value of a, reduction plane pixel or an intermediate plane pixel. In this instance, even if an intermediate plane is formed first and then a reduction plane is produced from the intermediate plane, a same result as that obtained where a reduction plane is produced immediately from an original screen image is obtained. Therefore, this method is higher in efficiency.

It is to be noted that, when a reduction image is to be produced, the reduction ratio in the horizontal direction and the reduction radio in the vertical direction may be same as in the case described above or may otherwise be different from each other.

After a reduction plane and an intermediate plane are produced in such a manner as described above, a reduction plane target block 212 is set to the reduction plane target frame 211 and a reduction plane search range 313 is set to the reduction plane reference frame 311 first. Then, the block matching process is carried out for a plurality of reduction plane reference blocks 312 in the reduction plane search range 313 by a reduction plane motion vector detection apparatus 401 to detect a reduction plane reference block position which exhibits the lowest SAD value to detect a reduction plane motion vector MVs.

In the present example, the reduction plane motion vector detection apparatus 401 executes the processing for a block matching processing unit which is a block of a size of the reduction plane target block 212, that is, a block of the pixel number in the horizontal direction×line number in the vertical direction.

After the calculation of the reduction plane motion vector MVs ends, an intermediate plane target block 222 is set on the intermediate plane target frame 221 which is equal in size to the reduction plane target frame 211 multiplied by a.

In the example of FIG. 11, an intermediate plane motion vector detection apparatus 402 carries out the block matching process for an intermediate target block which is a block of a size same as that of the block matching processing unit of the reduction plane motion vector detection apparatus 401, that is, a block of an equal pixel number=an equal number of pixels in the horizontal direction×an equal number of lines in the same vertical direction.

In the case of the present example, since the reduction plane has a size of 1/a that of the intermediate plane, the number of intermediate plane target blocks 222 included in a region of the intermediate plane target frame corresponding to the reduction plane target block 212 is a, and all of the intermediate plane target blocks 222 are set as a block matching processing object of the intermediate plane motion vector detection apparatus 402.

Then, in the intermediate plane reference frame 321 having a size equal to times that of the reduction plane reference frame 311, an intermediate plane search range 323 centered at the reduction plane motion vector MVs is set. Then, the block matching process described above is carried out by the motion vector detection apparatus 402 for a plurality of intermediate plane target blocks 322 within the intermediate plane search range 323 to detect an intermediate plane reference block position which exhibits the lowest SAD value to detect an intermediate plane motion vector MVm.

The intermediate plane motion vector detection apparatus 402 executes the block matching process in each of the a intermediate plane target blocks set in the intermediate plane search range 323 to detect a motion vector of each of the intermediate plane target blocks. Then, that one of the plural motion vectors which exhibits the lowest SAD value is detected as the reduction plane motion vector MVs of the intermediate plane, that is, as the intermediate plane motion vector.

After the calculation of the reduction plane motion vectors MVs ends, a base plane target block 202 is set in the base plane target frame 201 having a size equal to b times that of the intermediate plane target frame 221.

In the example of FIG. 11, also a base plane motion vector detection apparatus 403 carries out the block matching process for a processing unit block which is a block of a size same as those in the motion vector detection apparatus 401 and 402, that is, of an equal pixel number=equal pixel number in the horizontal direction×equal line number in the vertical direction.

Then, since the intermediate plane motion vector MVm is obtained in a unit of a processing unit block as described hereinabove, the number of base plane target blocks 202 of the base plane target frame 201 which is an object of the base plane motion vector detection apparatus 403 is set so as to be equal to b times the number of blocks, that is, processing unit blocks, of a size equal to that of the reduction plane as indicated by slanting lines in FIG. 11.

On the other hand, in the base plane reference frame 301 having a size equal to b times that of the intermediate plane reference frame 321, a base plane search range 303 centered at a composite vector of the reduction plane motion vector MVs and the intermediate plane motion vector MVm is set. The block matching process described above is carried out for a plurality of base plane reference blocks 302 in the base plane search range 303 by the base plane motion vector detection apparatus 403 to detect the position of a base plane reference block which exhibits the lowest SAD value to detect a base plane motion vector MVb.

Since the reduction plane motion vector MVs and the intermediate plane motion vector MVm are obtained in a unit of a processing unit block of the same size, the base plane search range 303 set centered at the composite vector of the reduction plane motion vector MVs and the intermediate plane motion vector MVm is a little greater than the region which includes the b base plane target blocks 202.

The base plane motion vector detection apparatus 403 executes the program matching process in a search range in the base plane target blocks set in the base plane search range 303 with the b base plane target blocks 202 to carry out detection of a motion vector of the base plane target blocks. Then, that one of the plural motion vectors which exhibits the lowest SAD value is detected as a base plane motion vector MVb, that is, a base plane motion vector of the base plane.

Then, as a composite vector of the reduction plane motion vector MVs, intermediate plane motion vector MVm and base plane motion vector MVb determined in such a manner as described above, a local motion vector LMV of the base plane target block between the base plane target frame 201 and the base plane reference frame 301 is detected.

Such a layered block matching process as described above is executed for all regions of the target frame and the reference frame while the target block and the reference block are successively changed over to calculate all of a plurality of local motion vectors LMV in a unit of a plurality of target blocks set in the target frame.

In the example of FIG. 11, the motion vector detection apparatus 401, 402 and 403 actually are a substantially one apparatus but are different among them in the target block read out from the image memory unit 4 and inputted and the reference block read out from within the search range.

It is to be noted that, where the base plane target frame 201 is configured so as to obtain the local motion vector LMV of all of the base plane target blocks 202, the changeover of the target block should be carried out such that the reduction plane target block is set, on the reduction plane, while successively displacing the reduction plane, in the horizontal direction, by an amount corresponding to the number of pixels in the horizontal direction in accordance with the scales 1/a and 1/b and, in the vertical direction, by an amount corresponding to the number of lines in the vertical direction in accordance with the scales 1/a and 1/b.

However, from the object that a global motion vector GVM is determined from a plurality of local motion vectors LMV, the reduction plane target block may be set successively displacing the same in the horizontal direction and the vertical direction such that the local motion vector LMV is obtained regarding the base plane target blocks at skipping positions of the base plane target frame 201.

It is to be noted that the layered block matching described above may otherwise be carried out only with two layered of the reduction plane and the base plane with the intermediate plane omitted, or may include a plurality of intermediate layers for different intermediate planes. However, if the reduction ratio is so high that a moving image pickup object and the background are included in the same unit block, then motion vectors which should originally be detected as different motion vectors are handled as a single motion vector. Since recovery is impossible in later layer, selection of the reduction ratio must be carried out carefully.

Figure 12:
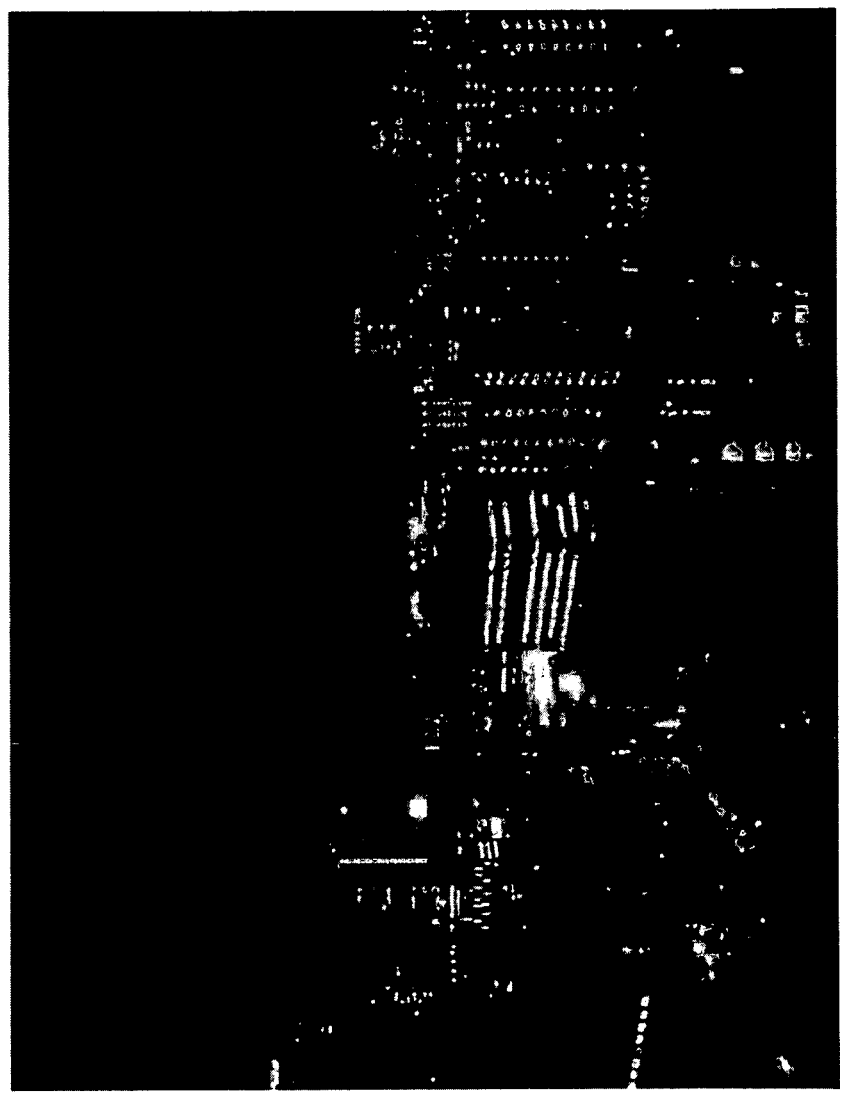
FIG. 12 is a view showing an example of a picked up image to which an image processing method according to an embodiment.
Figure 13:
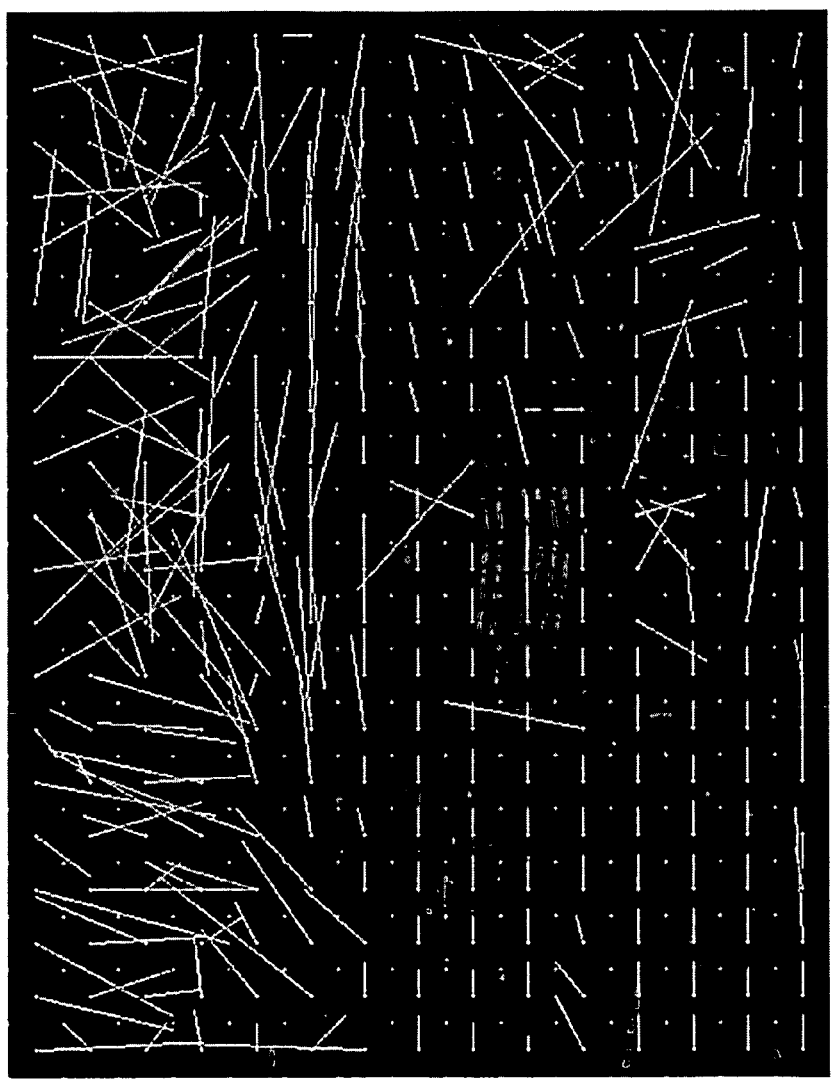
FIG. 13 is a schematic view showing local motion vectors detected using the image processing method in an associated relationship with the picked up image of FIG. 12.

Calculation of Reliability of the Local Motion Vector LMV

Where an image having a comparatively great amount of noise is a target image, frequently a correct vector cannot be obtained because the SAD value is influenced by the noise. FIG. 12 is a photograph of a night view, which includes a comparatively great amount of noise. If motion vectors between the image of FIG. 12 and an image picked up with camera shake in the leftward direction while a very small amount of rotation is involved are illustrated, then such a result as shown in FIG. 13 is obtained. FIG. 13 is obtained by plotting reduction plane motion vectors of a reduced image obtained by reducing the original picture to ⅛.

As can be seen from FIG. 13, motion vectors of the night sky whose texture is not particularly clear are obtained as quite diverse motions. In the layered block matching, since a low-pass filter is applied upon production of a reduced image, the noise resisting property is comparatively high. However, the reduced image is influenced by noise as seen in FIG. 13. Since the local motion vector LMV of the base plane is obtained by search around a reduction plane motion vector, if the reduce screen image motion vector is displaced from a correct motion vector, then recovery is ineffective and the reduction plane motion vector is influenced directly by noise and is further disordered.

Even if a picked up image having no noise at all is an object image, if the texture of the image is not clear, then the variation of the gradation by a small variation of external light upon consecutive shooting image pickup or a difference in exposure time is greater, and the detected motion vector is frequently displaced from a correct value. Further, while a large number of trees or artificial structures such as buildings have many repeated patterns of a texture, even with such a repeated pattern of a texture as just described, a detected motion vector is likely to be displaced from a correct value.

Assuming such a case as just described, an attempt of calculating a global motion using only motion vectors having high reliability has been used in related art. For example, it has been proposed to carry out edge detection of a target image and determines a motion vector of a block having a clear edge as a motion vector having high reliability or calculates reliability using a DC component and AC components of a result of IDCT (Inverse Discrete Cosine Transform) of a target image.

Also a method has been proposed wherein characteristic points on a target image are detected using a corner detector which is a kind of filter so that resulting motion vectors have high reliability or, from an assumption that a positional relationship of a plurality of characteristic points is maintained also on a reference image, a motion vector of high reliability is extracted from a combination of a plurality of motion vectors.

However, such existing techniques as described above do not assume an image of high noise and apparently fail with an image having noise of a very high level.

In the present embodiment, taking the foregoing situation described above into consideration, a countermeasure is taken to obtain a reliability index value with which the reliability of a motion vector even of an image in a high noise environment can be evaluated.

In the present embodiment, the difference or ratio of a first maximum value and a second maximum value from among correlation values between a target block and a reference block is used as an index value to the reliability of a motion vector. In the present embodiment, since a correlation value between the target block and the reference block is detected as a SAD value, the first maximum value and the second maximum value of the correlation value are a first minimum value and a second minimum value of the SAD value, respectively.

Figure 14:
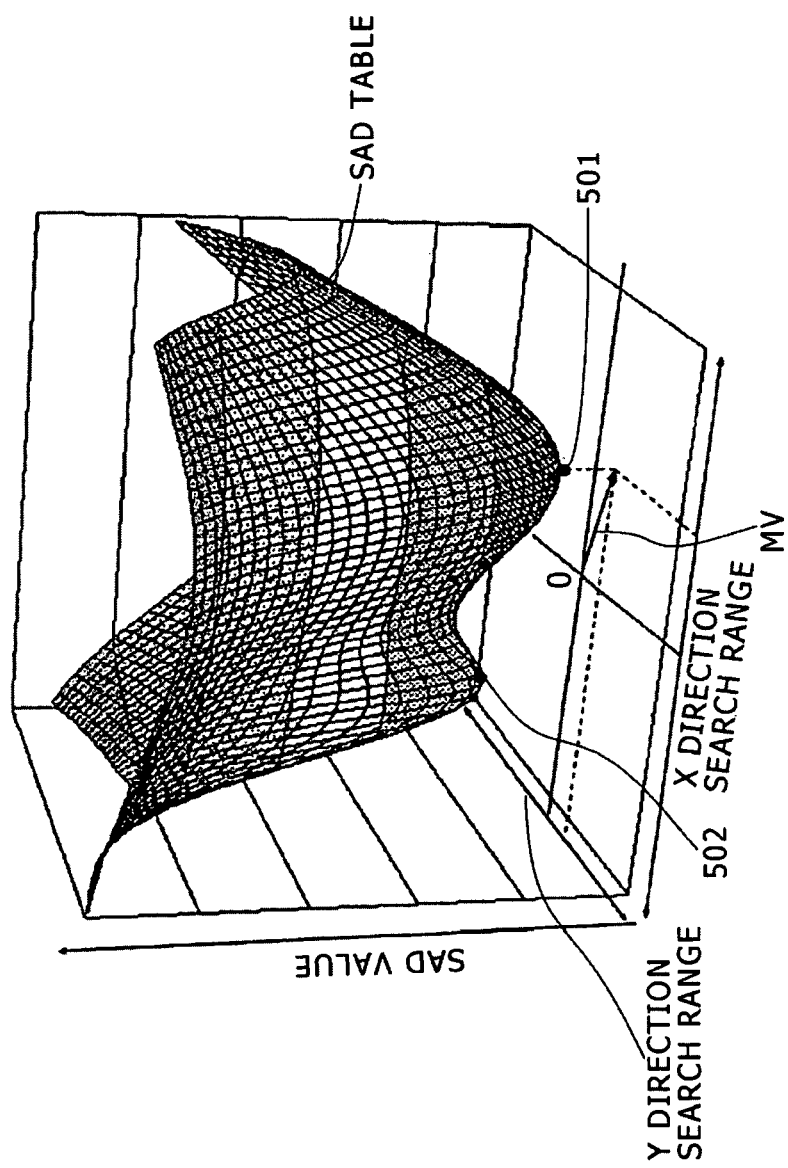
FIG. 14 is a diagrammatic view illustrating a SAD table used in the image processing method.

FIG. 14 schematically illustrates SAD values of a SAD table regarding one target block. In FIG. 14, the search range is represented as a two-dimensional range in the horizontal direction or x direction and the vertical direction or y direction of the image, and the SAD values are taken in the heightwise direction, that is, in a direction perpendicular, to the x and y directions. Consequently, the SAD table is represented as a cubit curved face.

In an ordinary block matching process, in order to detect a motion vector, only the lowest value of the SAD value in the SAD table is determined as a detection object. However, this lowest value of the SAD value is the first minimum value of the SAD value in the SAD table, and in FIG. 14, the value assumes the position represented by a point 501. In FIG. 14, a motion vector MV is detected as a vector from the origin of the movement, that is, (x=0, y=0) to the minimum value position of the SAD value indicated by the point 501.

If an ideal state in which no noise exists is considered, then when a correlation value between a plurality of reference blocks and a target block within a search range is determined, the SAD table represented by a cubit curved face exhibits a state wherein the cubit curved face is uniformly downwardly convex and only one minimum value of the SAD value exists. However, in an actual image pickup situation, the SAD table represented by a cubic curved face scarcely indicates a uniformly downwardly convex shape but usually has a plurality of minimum values of the SAD value because not only of an influence of a light amount variation, a motion of a moving body or the like but also of various kinds of noise.

Therefore, in the present embodiment, the motion vector MV is detected based on the position of a reference block which exhibits the first minimum value equal to the lowest value of the SAD value. However, a minimum value from among the SAD values except the first minimum value of the SAD value, that is, the second minimum value of the SAD value, is detected for production of an index to the reliability. In FIG. 14, the position indicated by the point 501 represents the first minimum value, and the position indicated by another point 502 represents the second minimum value.

If the influence of noise and so forth is limited, then the difference between the first minimum value of the SAD value and the second minimum value of the SAD value is great, and the reliability of the motion vector MV detected from the first minimum value of the SAD value, that is, from the lowest value of the SAD value, is high. On the other hand, in another environment which includes much noise and so forth, the difference between the first minimum value of the SAD value and the second minimum value of the SAD value is small, and it cannot be discriminated which one of the first and second minimum values of the SAD value corresponds correctly to the motion vector MV. Therefore, the reliability is low.

Figure 15:
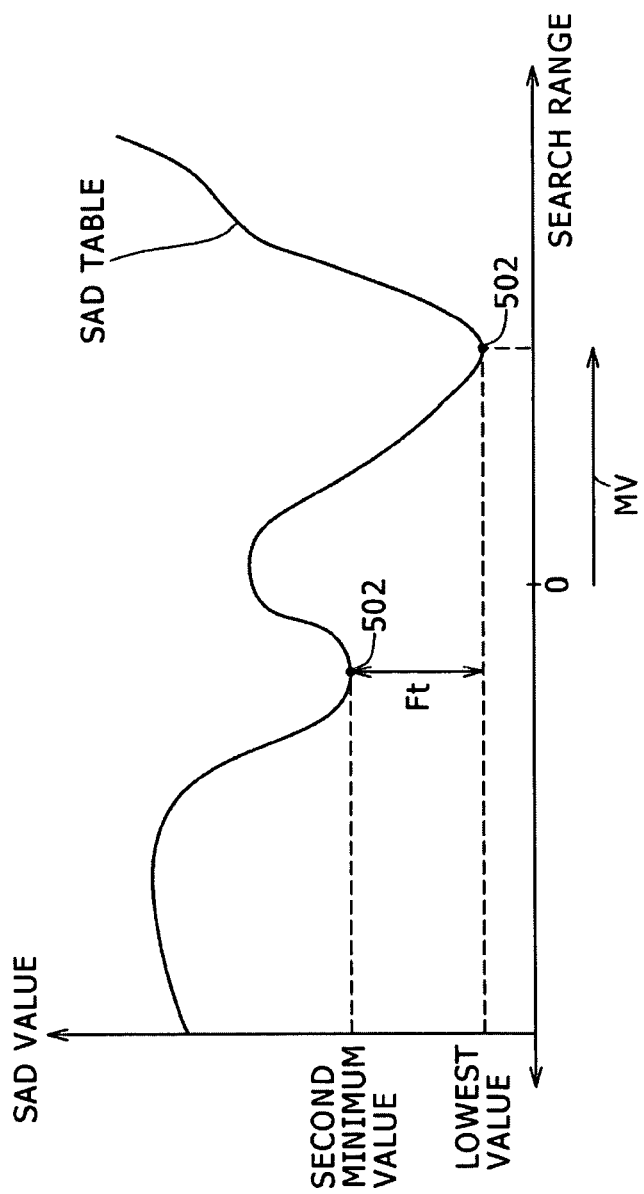
FIG. 15 is a diagrammatic view showing the SAD table of FIG. 14 taken on a one-dimensional axis.

From the foregoing, the difference between the first minimum value of the SAD value (lowest value of the SAD value) and the second minimum value of the SAD value is determined as an index to the reliability of the detected motion vector. A SAD table wherein the search range in FIG. 14 is represented on a one-dimensional axis is illustrated in FIG. 15. In the present embodiment, the value of the difference between the second minimum value and the first minimum value, that is, the lowest value of the SAD value, in FIG. 15 is determined as an index value Ft of the motion vector MV.

It is to be noted that, where only a first minimum value of the SAD value is obtained but a second minimum value is not obtained, in the present embodiment, the theoretically highest value of the SAD value or the highest value of the SAD value in the SAD value table is determined as a reliability index value of the motion vector MV. Accordingly, it is determined that the motion vector of such a block as just described is high. However, since a block of the type described seldom exists, a motion vector of a block from which only the first minimum value of the SAD value is obtained but no second minimum value is obtained may be excluded from evaluation of the reliability.

It is to be noted that, in place of the difference between the first minimum value of the SAD value (lowest value of the SAD value) and the second minimum value of the SAD value, the ratio between the first minimum value of the SAD value (lowest value of the SAD value) and the second minimum value of the SAD value may be used as the index value Ft of the motion vector MV. However, in the following description, the difference between the first minimum value of the SAD value (lowest value of the SAD value) and the second minimum value of the SAD value is used.

According to the reliability index of a motion vector in the present embodiment, since not an image component such as an edge or a characteristic of an image as in the related art but only a correlation value between a target frame and a reference frame is used, the robustness against noise is high. In other words, a reliability index of a motion vector having high accuracy is obtained without being influenced by noise of an image.

Further, in the present embodiment, also that the difference or ratio between the first maximum value of the correlation value (first minimum value of the SAD value) and the second maximum value of the correlation value (second minimum value of the SAD value) is used makes a reason that the reliability index of the motion vector in the present embodiment has high robustness against noise.

In particular, if the noise level rises, then even if the motion vector is correct, the SAD value of the motion vector rises. Therefore, where a threshold value is set for the index value Ft of the motion vector to carry out a comparison process with the threshold value in order to extract a motion vector having high reliability, it is necessary to vary also the threshold value itself in response to the noise level.

In contrast, where the index value Ft of the motion vector in the present embodiment is used, since both of the first maximum value of the correlation value (first minimum value of the SAD value) and the second maximum value of the correlation value (second minimum value of the SAD value) rise in response to the noise level, the influence of noise is canceled in the difference between them. In other words, a threshold value process of a fixed value which does not depend upon the noise level can be achieved. This similarly applies also where the ratio between the first maximum value of the correlation value (first minimum value of the SAD value) and the second maximum value of the correlation value (second minimum value of the SAD value) is used as the index value Ft of the motion vector.

Incidentally, where the contrast of an image of an object block for which block matching is carried out is low, the difference between the second minimum value of the SAD value and the lowest value of the SAD value has a tendency to decrease. Therefore, when the same frame includes a region having a high contrast and another region having a low contrast, if the same threshold value is used for evaluation of the evaluation value Ix of the vector reliability, then the region having the high contrast is likely to be selected preferentially.

Although this is a correct result from a point of view of reliability of the motion vector, in order to relieve regions having a low contrast to some degree, in the present embodiment, a term for moderating the influence of the contrast is added to a mathematical operation expression for determining an index value to the reliability of a motion vector. In particular, the difference between the value of the highest luminance and the value of the lowest luminance of an image of a target frame is determined, and the difference in luminance is reflected on the index value to the reliability of the motion vector. It is to be noted that, in order to avoid a bad influence of noise, extraction of the highest luminance and the lowest luminance is carried out after a low-pass filter is applied to image data of the target frame.

Taking the foregoing into consideration, the calculation expression of the index value Ft in the present embodiment is given as:

$$Ft=(Btm2SAD-\text{MinSAD})-(\text{Max}TAR-\text{Min}TAR)\times Co \quad (\text{expression 1})$$

where
Ft: reliability index value of the motion vector
Btm2SAD: second minimum value of the SAD value
MinSAD: lowest value (first minimum value) of the SAD value
MaxTAR: highest luminance value of the target block
MinTAR: lowest luminance value of the target block
Co: weight coefficient ($\leq 1$)

It is to be noted that, also where the ratio between the first maximum value of the correlation value and the second maximum value of the correlation value is used as the motion vector reliability index value, a term for moderating the influence of the contrast may be added to the reliability index value calculation expression quite similarly to the (expression 1) given hereinabove. However, in calculation of the index value Ft of the motion vector, it is not essentially required to add a term for moderating the influence of the contrast, but the term may be omitted.

While, in the foregoing description, only the motion vector reliability index value of the base plane motion vector MVb is determined, naturally the motion vector reliability index value can be determined similarly also with regard to the reduction plane motion vector MVs or the intermediate plane motion vector MVm.

Calculation of the Global Motion Vector GVM

In related art, such a reliability index value of a motion vector as described above is not used; all of a plurality of local motion vectors LMV determined with regard to a target frame is used with an equal weight to calculate a global motion vector GVM.

In contrast, in the present embodiment, the reliability index value Ft of each of a plurality of local motion vectors LMV of a target frame can be obtained in such a manner as described above.

Then, the reliability index values of the plural local motion vectors LMV determined in this manner can be normalized to determine a weight coefficient, for example, equal to or higher than 0 but equal to or lower than 1 to each of the local motion vectors LMV. Then, in the calculation mathematic operation of the global motion vector GVM, the local motion vectors LMV can be used not with an equal weight but with weights determined in accordance with the respective weighting coefficients to calculate the global motion vector GVM.

However, in order to simplify the mathematic operation process of the global motion vector GVM to reduce the mathematic operation load, in the present embodiment, the weighting coefficients W of the local motion vectors LMV are binarized to 0 and 1.

Therefore, in the present embodiment, a threshold value th for the index value Ft of the motion vector is set, and the weighting coefficient W of each global motion vector GVM is calculated using the index value Ft of each motion vector in accordance with the mathematic operation expressions:

when $Ft>th, W=1$, but when $Ft \leq th, W=0$ \hfill (expression 2)

This is equivalent to that the index value Ft is used to decide the reliability of each of a plurality of local motion vectors LMV and only those local motion vectors LMV which have high reliability are extracted from among the plural local motion vectors LMV and then only the extracted local motion vectors LMV having high reliability are used to calculate the global motion vector GVM. In the present embodiment, since the number of target blocks in a target frame is comparatively great, even where a method of extracting only the local motion vectors LMV having high reliability as in the present example is used, a global motion vector GVM having high accuracy can be calculated.

It is to be noted that a particular processing example of calculating a global motion vector GVM from a plurality of local motion vectors LMV is hereinafter described.

Figure 16:
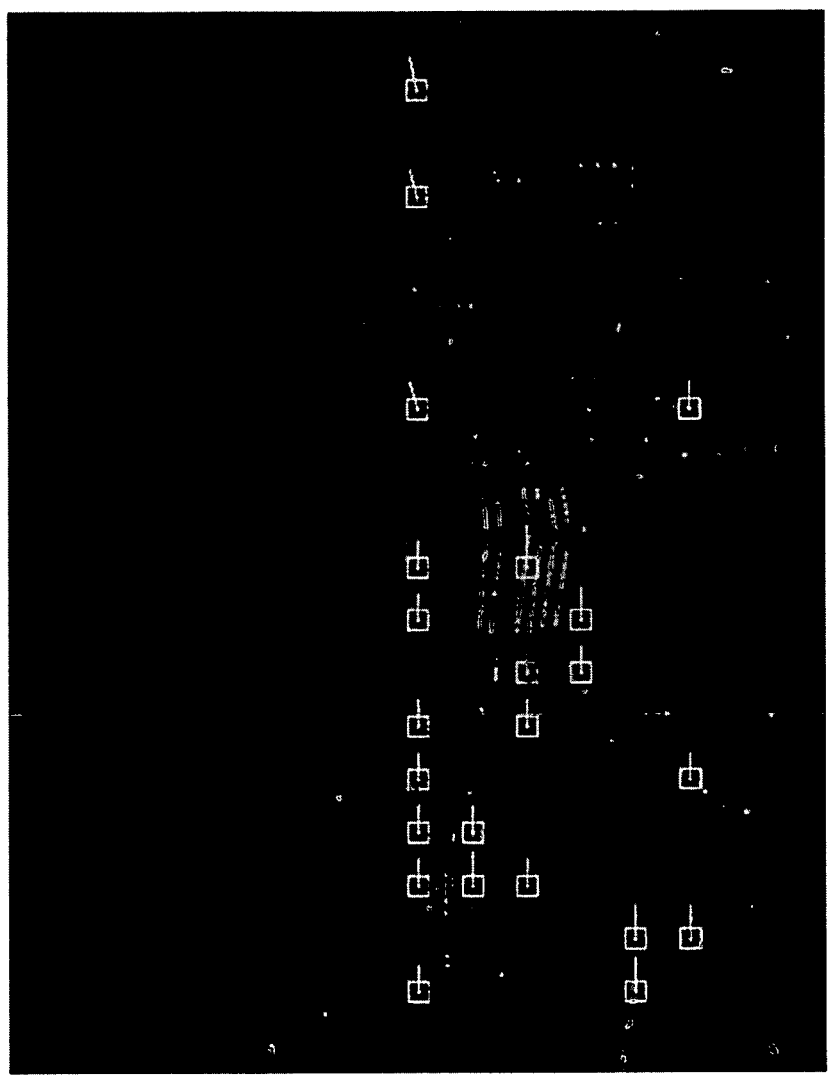
FIG. 16 is a view showing local motion vectors, which are determined such that they have high reliability by the image processing method, in an associated relationship the picked up image of FIG. 12.

Although such local motion vectors as illustrated in FIG. 13 are obtained from the image having a great amount of noise described hereinabove with reference to FIG. 12, if decision of the reliability is carried out for the local motion vectors indicated on the image of FIG. 13 using the reliability index value of the motion vector according to the present embodiment to extract only those reliability index values which have reliability higher than a threshold value and then the blocks and the motion vectors are plotted, then such an image as seen in FIG. 16 is obtained. It is considered that, as regards the blocks shown in FIG. 16, substantially correct local motion vectors are obtained without being influenced by noise.

Example of the Hardware Configuration of the Global Motion Vector Calculation Block 15

The global motion vector calculation section 15 carries out such processes as detection of a local motion vector LMV for each target block, calculation of a reliability index value of the detected local motion vector LMV, calculation of a global motion vector GVM and so forth as described hereinabove.

Figure 17:
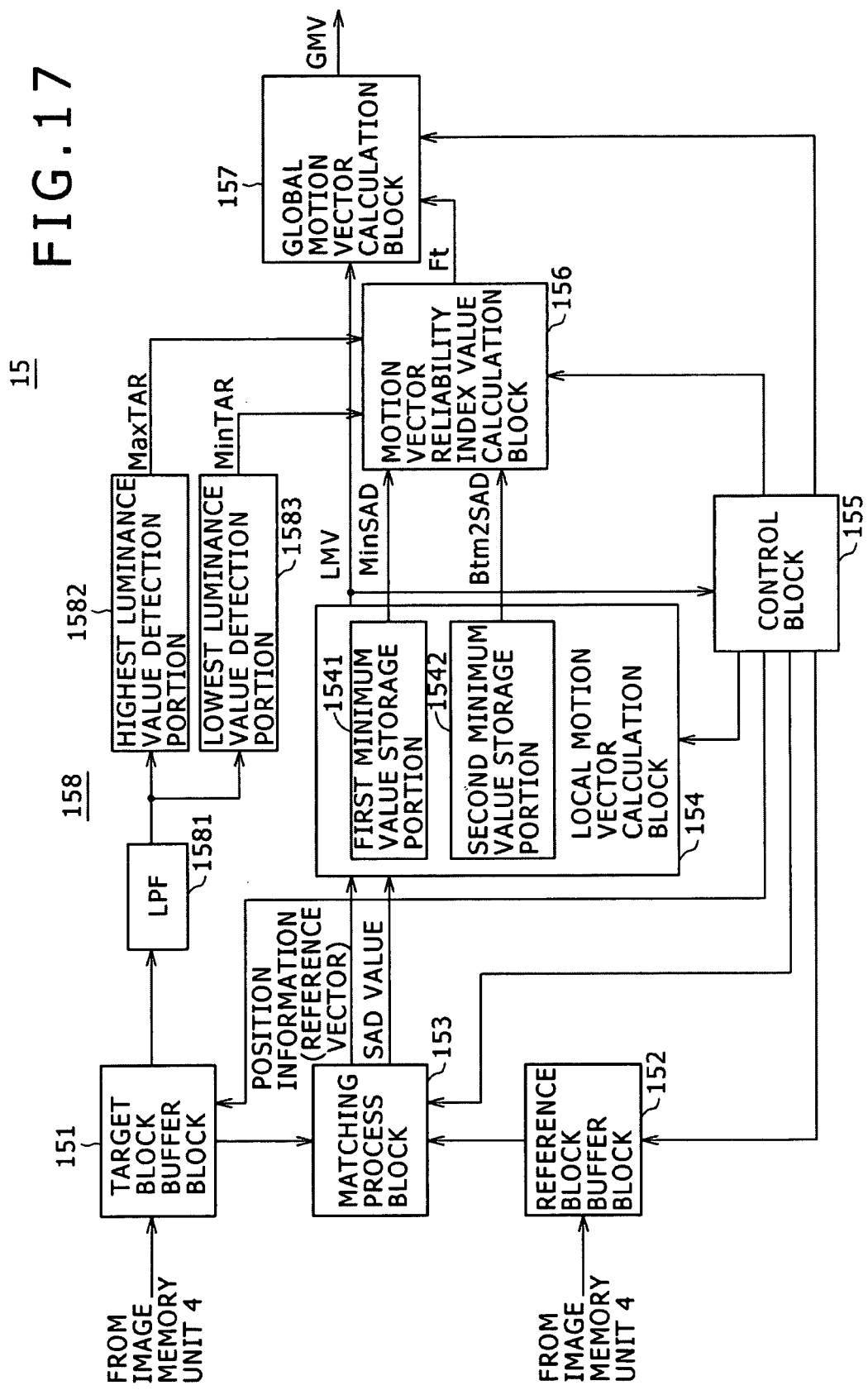
FIG. 17 is a block diagram showing an example of a configuration of a global motion vector calculation block of the image processing apparatus.

An example of the hardware configuration of the global motion vector calculation section 15 is shown in FIG. 17. Referring to FIG. 17, the global motion vector calculation section 15 includes a target block buffer block 151 for storing pixel data of a target block 102, a reference block buffer block 152 for storing pixel data of reference blocks 108, a matching processing block 153 for calculating the SAD value of corresponding pixels of the target block 102 and the reference blocks 108, a local motion vector calculation block 154 for calculating local motion vectors from SAD value information outputted from the matching processing block 153, a control block 155, a motion vector reliability index value calculation section 156, a global motion vector mathematic operation block 157 and a contrast calculation block 158.

The contrast calculation block 158 includes a low-pass filter 1581, a highest luminance value detection portion 1582 and a lowest luminance value detection portion 1583.

Further, though not shown, in the present example, image data of the reduction plane and image data of the intermediate plane of a target frame and a reference frame of an original picture produced from image data of the target frame and the reference frame are stored and retained in the image memory unit 4.

The control block 155 controls a processing sequence of the global motion vector calculation section 15 and supplies control signals to the components of the global motion vector calculation section 15 as seen in FIG. 17.

The target block buffer block 151 reads in image data of a designated target block from image data of a target frame of the reduction plane, intermediate plane or base plane of the image memory unit 4 and supplies the image data to the matching processing block 153 under the control of the control block 155.

The reference block buffer block 152 reads in image data within a designated matching processing range from among the image data of a reference frame of the reduction plane, intermediate plane or base plane of the image memory unit 4 and supplies the image data of the reference block successively from among the image data of the matching processing range to the matching processing block 153 under the control of the control block 155.

The matching processing block 153 receives the image data of the target block from the target block buffer block 151 and the image data of the reference block from the reference block buffer block 152 and carries out the block matching process for the reduction plane, intermediate plane and base plane under the control of the control block 155. Then, the matching processing block 153 supplies a reference vector, that is, position information of the reference block, and a SAD value of a result of the block matching process to the local motion vector calculation block 154.

The local motion vector calculation block 154 includes a first minimum value storage portion 1541 for a SAD value and a second minimum value storage portion 1542 for a SAD value and carries out a process of detecting a first minimum value of the SAD value and a second minimum value of the SAD value from among the SAD values from the matching processing block 153.

Then, the local motion vector calculation block 154 successively updates the first minimum value of the SAD value in the first minimum value storage portion 1541 for a SAD value and position information, that is, a reference vector, of the first minimum value of the SAD value and the second minimum value of the SAD value in the second minimum value storage portion 1542 for a SAD value and position information, that is, a reference vector, of the second minimum value of the SAD value. Then, when the block matching process for all reference blocks in the matching processing range ends, the local motion vector calculation block 154 executes a processing operation so that the first minimum value of the SAD value of the target block at the point of time and the position information or reference vector of the first minimum value of the SAD value and the second minimum value of the SAD value and the position information or reference vector of the second minimum value of the SAD value are stored into the first minimum value storage portion 1541 and the second minimum value storage portion 1542, respectively.

Then, when the block matching process for all of the reference blocks within the matching processing range ends, the local motion vector calculation block 154 detects the information of the reference vector, that is, the position information, stored in the first minimum value storage portion 1541 of a SAD value as a motion vector in each of the reduction plane, intermediate plane and base plane. The processing operation of the local motion vector calculation block 154 is hereinafter described in detail.

The local motion vector calculation block 154 in the present embodiment supplies, upon reduction plane matching processing, a reduction plane motion vector MVs as a local motion vector LMV to the control block 155.

The control block 155 determines a search range for the intermediate plane from the information of the reduction plane motion vector MVs and supplies control signals to the target block buffer block 151, reference block buffer block 152 and matching processing block 153 so that they carry out block matching in the intermediate plane.

Then, when the matching process in the intermediate plane ends, the local motion vector calculation block 154 supplies information of a composite vector of the reduction plane motion vector MVs and the intermediate plane motion vector MVm as the local motion vector LMV to the control block 155.

The control block 155 determines a search range for the base planes from the information of the composite vector of the reduction plane motion vector MVs and the intermediate plane motion vector MVm and supplies control signals to the target block buffer block 151, reference block buffer block 152 and matching processing block 153 so that they carry out block matching in the base plane.

When the matching process in the base plane ends, the local motion vector calculation block 154 supplies information of the composite vector of the reduction plane motion vector MVs, intermediate plane motion vector MVm and base plane motion vector MVb as a local motion vector LMV to and temporarily stored into the global motion vector mathematic operation block 157.

Further, when the matching process in the base plane ends, the motion vector reliability index value calculation section 156 is enabled by the control block 155 to receive the lowest value MinSAD of the SAD value of the first minimum value storage portion 1541 and the second minimum value Btm2SAD of the SAD value of the second minimum value storage portion 1542 supplied thereto from the local motion vector calculation block 154.

Further, at this time, the image data of the target block are supplied from the target block buffer block 151 to the highest luminance value detection portion 1582 and the lowest luminance value detection portion 1583 through the low-pass filter 1581. Then, the highest luminance value MaxTAR and the lowest luminance value MinTAR detected by the highest luminance value detection portion 1582 and the lowest luminance value detection portion 1583, respectively, are supplied to the motion vector reliability index value calculation section 156.

The motion vector reliability index value calculation section 156 uses the information supplied thereto to calculate the reliability index value Ft of the motion vector in accordance with the (expression 1) given hereinabove. Then, the motion vector reliability index value calculation section 156 supplies the calculated reliability index value Ft to the global motion vector mathematic operation block 157. The global motion vector mathematic operation block 157 temporarily stores the reliability index value Ft inputted thereto in an associated relationship with the local motion vector LMV supplied thereto at this time.

After the series of processes described above ends for all of the target blocks in the target frame, the control block 155 supplies a control instruction signal to the global motion vector mathematic operation block 157 to start a mathematic operation process of the global motion vector GVM.

In the present embodiment, the global motion vector mathematic operation block 157 first carries out, in accordance with the control instruction signal from the control block 155, decision of the reliability of a plurality of local motion vectors LMV stored therein in accordance with the (expression 2) given hereinabove using the motion vector reliability index values Ft stored in a corresponding relationship to the local motion vectors LMV to only those local motion vectors LMV which indicate high reliability.

Then, the global motion vector mathematic operation block 157 executes a mathematic operation process of calculating a global motion vector GVM using only the extracted local motion vectors LMV which have high reliability and supplies the resulting global motion vector GVM to the motion compensation production section 16 in the addition section 17.

As described hereinabove, the motion compensation production section 16 carries out a transformation process corresponding to the global motion with the global motion vector GVM for the image data REFv of the reference frame sent thereto through the global motion vector calculation section 15 to produce a motion compensation image. Then, the produced motion compensation image is superposed on the image data of the target frame.

Since the global motion vector GVM in the present embodiment is produced from the local motion vectors LMV having high reliability, it has high accuracy, and a reduced noise image obtained by the superposition is good in quality.

Processing Operation of the Local Motion Vector Calculation Block 154

Figure 18:
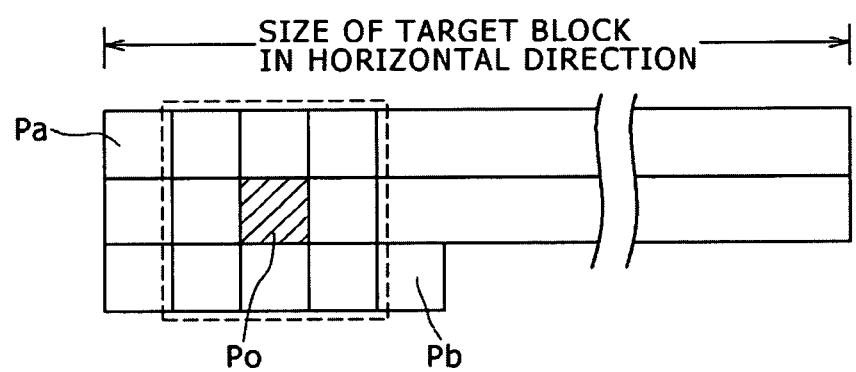
FIG. 18 is a diagrammatic view illustrating operation of the global motion vector calculation block.

The local motion vector calculation block 154 in the present embodiment determines, in order to detect a minimum value of the SAD value, a position Po as a decision object point and carries out comparison between the SAD value at the position Po and eight SAD values in the proximity of and around the position Po surrounded by a broken line framework in FIG. 18. Then, the local motion vector calculation block 154 decides whether or not the SAD value of the decision object point is the lowest value (hereinafter referred to as local minimum value) from among the nine SAD values in the region surrounded by the broken line framework.

Then, if the SAD value of the decision object point is determined as a local minimum value, then the local motion vector calculation block 154 compares the SAD value of the decision object point with the minimum value of the SAD value stored till then. Then, if the local motion vector calculation block 154 decides that the SAD value of the decision object point is lower than the minimum value of the SAD value stored till then, then it updates the minimum value of the SAD value stored therein with the newly detected local minimum SAD value.

When the local motion vector calculation block 154 searches the reference block in a unit of one pixel in order to detect such a local minimum SAD value as described above, in order to minimize the buffer memory of the SAD table for storing the SAD value, a buffer memory which can store SAD values for two lines of the size of the target block in the horizontal direction+three SAD values is prepared as seen in FIG. 18.

As can be seen from FIG. 18, if SAD values for two lines of the size of the target block in the horizontal direction+three SAD values are written into the buffer memory, then it becomes possible to decide the local minimum value at the position Po.

In order to minimize the size of the buffer memory, a newly inputted SAD value is overwritten at a memory position Pa at which an old SAD value which is not used for minimum value evaluation or local minimum value detection any more has been stored as seen in FIG. 18. In particular, although the newly inputted SAD value is to be written into a memory position Pb shown in FIG. 18 in accordance with the order, the memory position Pa which is not used any more is re-utilized to suppress increase of the hardware scale of the memory.

It is to be noted that the local motion vector calculation block 154 includes the first minimum value storage portion 1541 and second minimum value storage portion 1542 described hereinabove in addition to the buffer for storing a local minimum value.

Such a series of processes as described above is a basic process, and this basic process is applied to the first minimum value and the second minimum value to detect the lowest value of the SAD value and the second minimum value.

While, in the present embodiment, the local motion vector calculation block 154 carries out the same operation for the reduction plane, intermediate plane and base plane, the local motion vector calculation block 154 detects the local motion vector LMV and calculates the reliability index value of the local motion vector LMV on the base plane. Accordingly, the second minimum value of the SAD value is required only for the base plane, and the calculation and the storage of the second minimum value of the SAD value on the reduction plane and the intermediate plane may be omitted.

Figure 19:
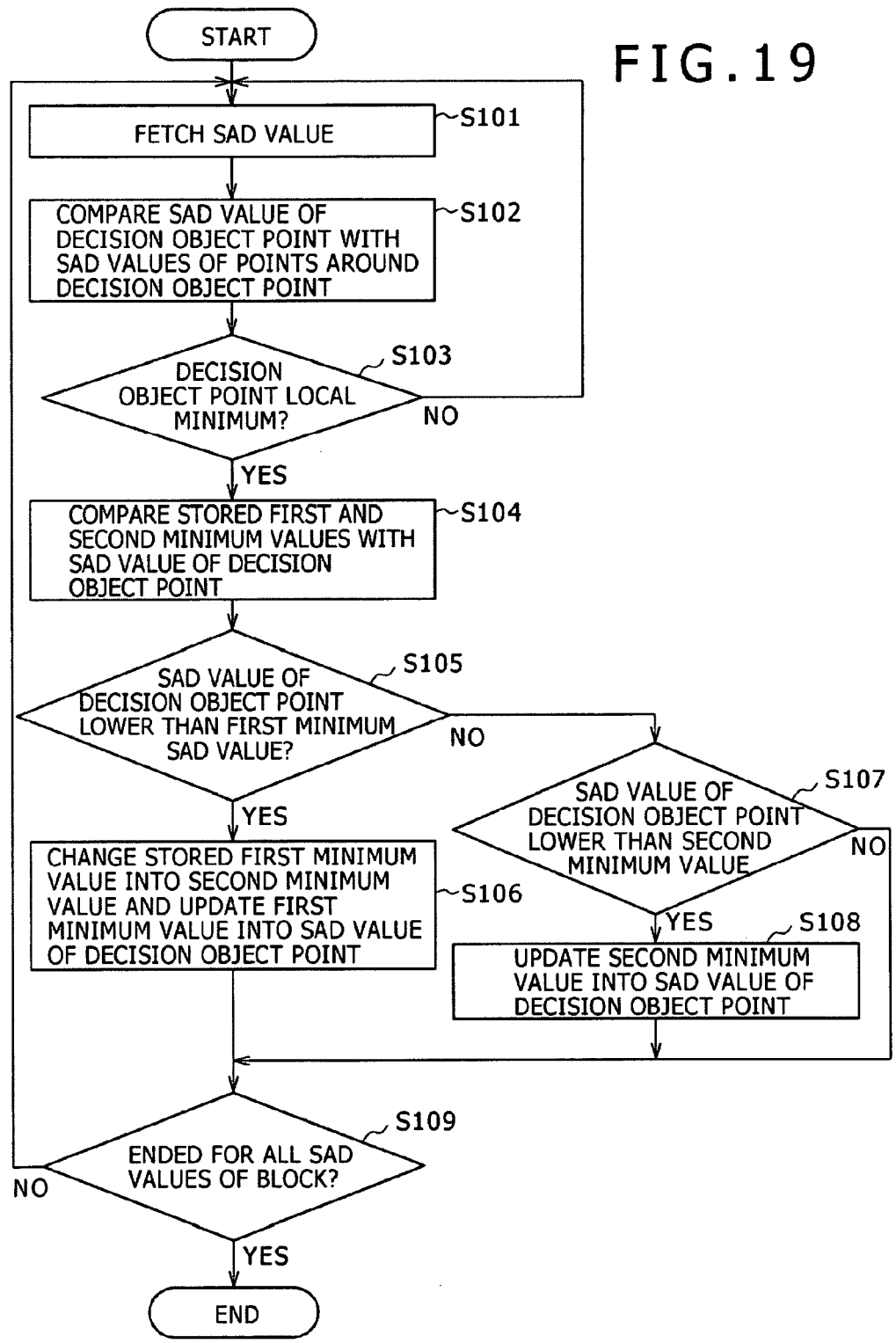
FIG. 19 is a flow chart illustrating an example of a detection processing operation by a local motion vector calculation block of the image processing apparatus.

FIG. 19 illustrates a flow of a detection processing operation of the first minimum value and the second minimum value by the local motion vector calculation block 154.

Referring to FIG. 19, the local motion vector calculation block 154 first fetches SAD values from the matching processing block 153 at step S101. Then, the local motion vector calculation block 154 compares the SAD value at the position Po and the eight SAD values at the positions surrounding the position Po with each other at step S102. Then, the local motion vector calculation block 154 decides based on a result of the comparison whether or not the SAD value at the position Po is a local minimum value at step S103.

If it is decided at step S103 that the SAD value at the position Po is not a local minimum value, then the processing returns to step S101 to carry out fetching of next SAD values.

On the other hand, if it is decided at step S103 that the SAD value at the position Po is a local minimum value, then the local motion vector calculation block 154 compares the first minimum value and the second minimum value of the SAD value stored therein with the SAD value at the position Po at step S104.

Then, the local motion vector calculation block 154 decides whether or not the SAD value at the position Po is lower than the first minimum value of the SAD value stored therein. Then, if it is decided that the SAD value at the position Po is lower, then the local motion vector calculation block 154 updates the second minimum value storage portion 1542 with the SAD value stored in the first minimum value storage portion 1541 and stores the SAD value at the position Po into the first minimum value storage portion 1541 at step S106.

Then, the local motion vector calculation block 154 decides whether or not the calculation process of the SAD value with regard to all of the reference blocks is completed with the target block at step S109. If it is decided that the calculation process is not completed as yet, then the processing returns to step S101, at which next SAD values are fetched. On the other hand, if it is decided at step S109 that the calculation process of the SAD value with regard to all of the reference blocks is completed with the target block, then the local motion vector calculation block 154 ends the processing routine.

On the other hand, if it is decided at step S105 that the SAD value at the position Po is equal to, or higher than the first minimum value of the SAD value stored therein, then the local motion vector calculation block 154 decides whether or not the SAD value at the position Po is lower than the second minimum value of the SAD value stored therein at step S107. If it is decided that the SAD value at the position Po is lower, then the local motion vector calculation block 154 updates the SAD value stored in the second minimum value storage portion 1542 with the SAD value at the position Po at step S108.

The processing advances from step S108 to step S109, at which the local motion vector calculation block 154 decides whether or not the calculation process of the SAD value with regard to all of the reference blocks is completed. If it is decided that the calculation process is not completed as yet, then the processing returns to step S101 to fetch next SAD values. On the other hand, if it is decided at step S109 that the calculation process of the SAD value with regard to all of the reference blocks for the target block is completed, and then the processing routine is ended.

On the other hand, if it is decided at step S107 that the SAD value at the position Po is not lower than the second minimum value of the SAD value stored therein, then the processing advances to step S109, at which the local motion vector calculation block 154 decides whether or not the calculation process of the SAD value with regard to all of the reference blocks for the target block is completed. If it is decided that the calculation process is not completed as yet, then the processing returns to step S101 to fetch next SAD values. On the other hand, if it is decided at step S109 that the calculation process of the SAD value with regard to all of the reference blocks for the target block is completed, then the processing routine is ended.

The processing flow chart illustrated in FIG. 19 can be applied similarly among the reduction plane, intermediate plane and base plane. With regard to the reduction plane and the intermediate plane, the SAD value stored finally in the first minimum value storage portion 1541 is detected as the lowest value MinSAD of the SAD value, and corresponding reference vectors are detected as the reduction plane motion vector MVs and the intermediate plane motion vector MVm, respectively. Then, the lowest value MinSAD and the reduction plane motion vector MVs and intermediate plane motion vector MVm are outputted.

On the other hand, with regard to the base plane, the SAD value finally stored in the first minimum value storage portion 1541 is detected as the lowest value MinSAD of the SAD value, and the corresponding reference vector is detected as the base plane motion vector MVb. Then, the lowest value MinSAD of the SAD value and the base plane motion vector MVb are outputted. Further, with regard to the base plane, the SAD value finally stored in the first minimum value storage portion 1541, that is, the lowest value MinSAD, and the SAD value finally stored in the second minimum value storage portion 1542, that is, the second minimum value of the SAD value, are supplied to the motion vector reliability index value calculation section 156.

Processing Operation of the Global Motion Vector Calculation Block 157

In the present embodiment, where a global motion vector GVM is calculated, or a global motion is estimated, from a large number of local motion vectors LMV, a method wherein the global motion is represented by affine transformation is used.

FIG. 20 illustrates a general formula of affine transformation as (expression 3). In the (expression 3), v represents a horizontal component of a motion vector of a target block, w a vertical component of the motion vector of the target block, a, b, c, d, e and f represent affine parameters, and x and y represent a horizontal component and a vertical component of the coordinate of the center of the target block, respectively.

Where the affine transformation is applied to the present embodiment, the sum total $\epsilon$ of errors of motion vectors observed on an ideal vector determined by affine transformation is represented like an (expression 4) of FIG. 21 from the coordinate of the center of each target block and a motion vector observed on each target block.

The proposition of deriving a global motion is estimation of the affine parameters a to f which minimize the sum total c of the errors described above and can be solved by the least squares method. FIGS. 22 to 24 illustrate a deriving process of the affine parameters a to f in accordance with an (expression 5), another (expression 6) and a further (expression 7) and results of the deriving process.

While parameters of affine transformation are calculated comparatively easily in this manner, the effect of this is high. Since the affine transformation is ready not only for parallel movement, rotation and enlargement or contraction but also for some degree of deformation, most camera shake, that is, fine correlation of the camera work, is covered.

Figure 25:
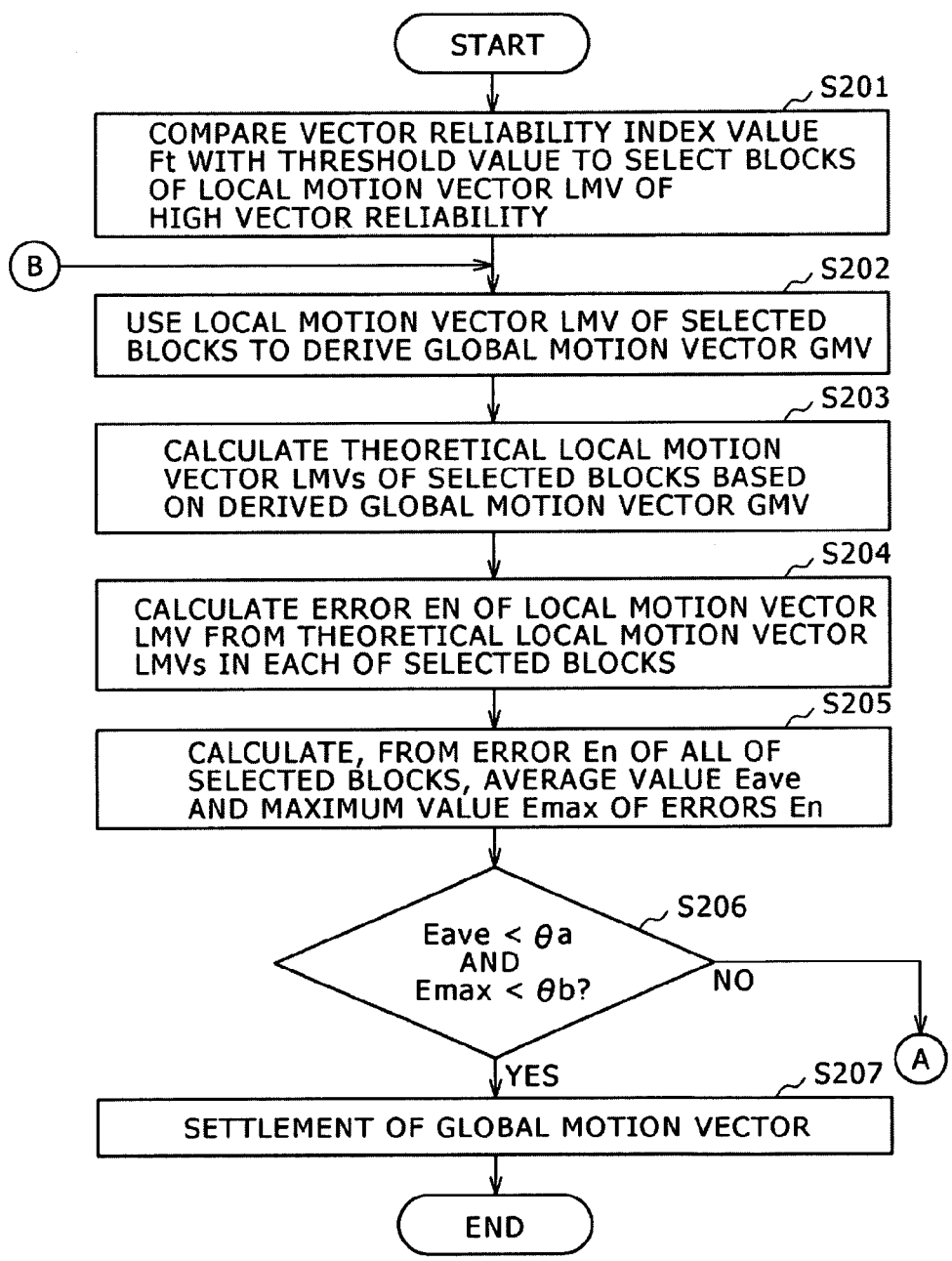
FIGS. 25 and 26 are flow charts illustrating an example of processing of determining a global motion vector from local motion vectors by the image processing method.
Figure 26:
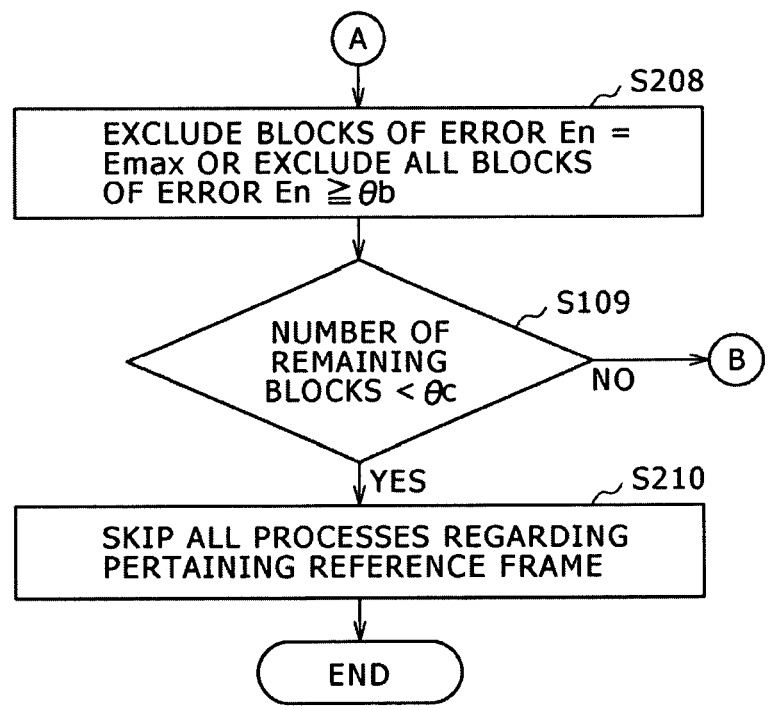

As a method of deriving the most preferable global motion from among an unspecified large number of vectors, a method illustrated in FIGS. 25 and 26 is used in the present embodiment. According to this method, from among blocks having high reliability, those blocks which are less likely to conform to a global motion such as a moving image pickup object are gradually excluded so that parameters of the global motion are converged.

Referring first to FIG. 26, the global motion vector calculation block 157 first compares the motion vector reliability index values Ft and a threshold value determined advance with each other in regard to a plurality of local motion vectors LMV stored therein to select only those target blocks (hereinafter referred to as blocks for simplified description) of the local motion vectors LMV having high reliability at step S201. This process corresponds to a case wherein two values of 1 and 0 are used as the weighting coefficient W as described hereinabove in connection with the (expression 2) given hereinabove.

Then, only the selected local motion vectors LMV of the plural blocks are used to derive or estimate a global motion vector GVM at step S202. In other words, the affine parameters a to f of the global motion vector GVM are calculated.

Then, the global motion vector calculation block 157 calculates a theoretical local motion vector LMVs of each of the blocks selected at step S201 based on the derived global motion vector GVM at step S203.

Then, for each of the plural selected blocks, an error EN between the local motion vector LMV determined by the block matching process and the theoretical local motion vector LMVs determined at step S203 is calculated at step S204.

The calculation of an error between the motion vector determined by the block matching and the theoretical motion vector may be carried out by correlation distance calculation from the Pythagorean theorem if importance is attached to the accuracy in mathematic operation. However, if importance is attached to the lightness rather than to the accuracy in mathematic operation, then the sum total of the distances determined between the two in the horizontal and vertical direction may be used as approximate distances.

Then, the global motion vector calculation block 157 uses all of the errors EN determined with regard to the selected plural blocks to calculate an average value Eave and the highest value Emax of all of the errors at step S205. Then, the global motion vector calculation block 157 decides whether or not the average value Eave is lower than a threshold value θa determined in advance and the highest value Emax is lower than a threshold value θb determined in advance at step S206.

If the global motion vector calculation block 157 decides as a result of the decision at step S206 that the conditions are not satisfied, then it excludes those blocks whose error EN determined at step S204 satisfies En=Emax from those blocks from which the global motion vector GVM is to be derived at step S208. Alternatively, the global motion vector calculation block 157 detects those blocks whose error EN satisfies En≥θb and excludes all of the detected blocks from those blocks from which the global motion vector GVM is to be derived at step S208.

Then, the global motion vector calculation block 157 decides whether or not, as a result of the block exclusion at step S208, the number of remaining blocks is smaller than a threshold value θc determined in advance at step S209. If it is decided that the number of remaining blocks is not smaller than the threshold value θc, then the processing returns to step S202 to repeat the above-described processes at the steps beginning with step S202 using the remaining blocks as selected blocks. On the other hand, if it is decided at step S209 that the number of remaining blocks is smaller than the threshold value θc, then since an appropriate global motion vector GVM cannot be obtained, the global motion vector calculation block 157 determines at step S210 that the image of the object reference frame is not used and skips all of later processes for the reference frame.

Then, if it is decided at step S206 of FIG. 25 that the average value Eave is lower than the threshold value θa and the highest value Emax is lower than the threshold value θb, then the global motion vector calculation block 157 determines that the mathematic operation has converged and finally determines the global motion vector GVM having the value at the time at step S207. Then, the processing routine is ended.

It is to be noted that whether only the block whose error EN is equal to the highest value Emax should be excluded or those blocks whose error EN is higher than the threshold value θb should be excluded collectively may be determined based on the balance between the rate of convergence and the accuracy when the global motion vector GVM is determined. If the accuracy takes precedence, then the former method may be adopted such that error blocks are excluded one by one, but if the rate of convergence takes precedence, then the latter method may be selected.

It is to be noted that a motion vector (which corresponds to the theoretical local motion vector MVs) for each target block calculated in accordance with the (expression 3) of FIG. 20 using the parameters a, b, c, d, e and f of affine transformation regarding the global motion determined in such a manner as described above is supplied as the global motion vector GVM from the global motion vector calculation section 15 to the motion compensation production section 16.

Then, the motion compensation production section 16 uses the motion vectors of the target blocks to produce motion compensation pictures for the individual target blocks and supplies the produced motion compensation pictures for the individual blocks to the addition section 17.

Figure 27:
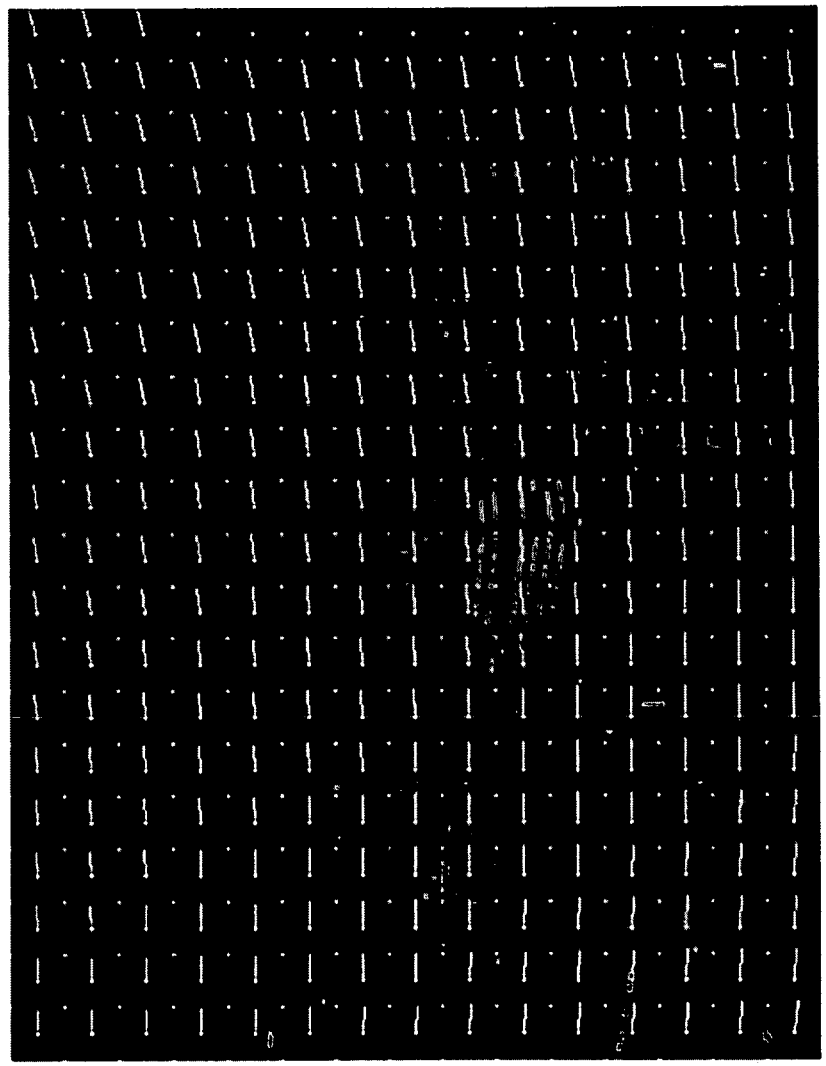
FIG. 27 is a view showing motion vectors in a unit of a block determined from the global motion vector determined by the image processing method in an associated relationship with the picked up image of FIG. 12.

The global motion vectors for the individual target blocks determined regarding the image of FIG. 12 having much noise are illustrated in FIG. 27.

Second Embodiment

In the embodiment described above, the local motion vector calculation block 154 carries out layered block matching to calculate a local motion vector LMV on the base plane. Then, the motion vector reliability index value calculation section 156 calculates the index value Ft to the local motion vector LMV of the base plane, and the global motion vector calculation block 157 uses the motion vector reliability index values Ft of the local motion vectors LMV of the base plane to extract those local motion vectors LMV which have high reliability and uses the local motion vectors LMV having high reliability to calculate the global motion vector GVM.

Incidentally, by multiplying the reduction plane motion vector MVs and the intermediate plane motion vector MVm by a reciprocal number to the image reduction ratio to the base plane, the base plane motion vector MVb can be obtained. Therefore, in order to calculate the global motion vector GVM, it is possible not to determine the base plane motion vector MVb but determine the global motion vector GVM from the reduction plane motion vector MVs or the intermediate plane motion vector MVm.

For example, in order to determine the global motion vector GVM from the reduction plane motion vector MVs, the motion vector reliability index value calculation section 156 calculates the reliability index value Ft to the local motion vector LMV of the reduction plane, that is, the reduction plane motion vector MVs, calculated by the local motion vector calculation block 154. Then the global motion vector calculation block 157 extracts those local motion vectors LMV having high reliability using the motion vector reliability index values Ft to the local motion vectors LMV of the reduction plane and uses the local motion vectors LMV having high reliability to calculate the global motion vector GVM.

The determination of the global motion vector GVM using local motion vectors of the reduction plane or the intermediate plane provides the following merits.

The first merit resides in that, since a low-pass filter is applied for production of the reduction plane or the intermediate plane as described above, noise is removed, and as a result, resulting local motion vectors are less likely to be influenced by noise.

The second merit resides in that, since the number of target blocks is reduced in the reduction plane or the intermediate plane, the number of local motion vectors decreases and the mathematic operation cost decreases and besides, since the time required for the processing is reduced, the processing can be carried out at a higher speed. This is because, since the matching process block units of the reduction plane, intermediate plane and base plane normally have an equal size from restrictions of hardware as in the example described above, the number of target blocks of the reduction plane having a small picture size, that is, the number of local vectors, relatively decreases in comparison with an alternative case wherein block matching is carried out only on the base plane.

Then, where the global motion vector GVM is determined from reduction plane motion vectors, the motion vector detection process on the intermediate plane and the base plane can be omitted. Alto in this regard, increase of the processing speed can be anticipated.

Accordingly, particularly where reduction plane motion vectors are used to determine the global motion vector GVM, the merit is significant.

However, since the reduction plane or the intermediate plane is produced by reducing an image of the base plane, it should be taken into consideration that the accuracy of such reduction plane motion vectors or intermediate plane motion vectors is comparatively low.

Therefore, in the present embodiment, where reduction plane motion vectors or intermediate plane motion vectors are used, block matching is carried out on the reduction plane or the intermediate plane first, and then an interpolation process is carried out using SAD values of reduction plane reference blocks or intermediate plane reference blocks in the proximity of reduction plane reference block positions or intermediate plane reference block positions indicated by calculated reduction plane motion vectors or calculated intermediate plane motion vectors and position information of the SAD values, whereafter detection of reduction plane motion vectors or intermediate plane motion vectors of the pixel accuracy is carried out. The interpolation process on the reduction plane is described below.

For example, where block matching is carried out on a reduction plane reduced to ¼ in both of the horizontal and vertical directions, the reduction plane motion vector is a motion vector of the 4-pixel accuracy. However, it is apparent that, in the base plane reference frame, a base plane motion vector MVb of the 1-pixel accuracy exists in the proximity of a motion vector obtained by increasing the reduction plane motion vector MVs to n times.

Figure 28:
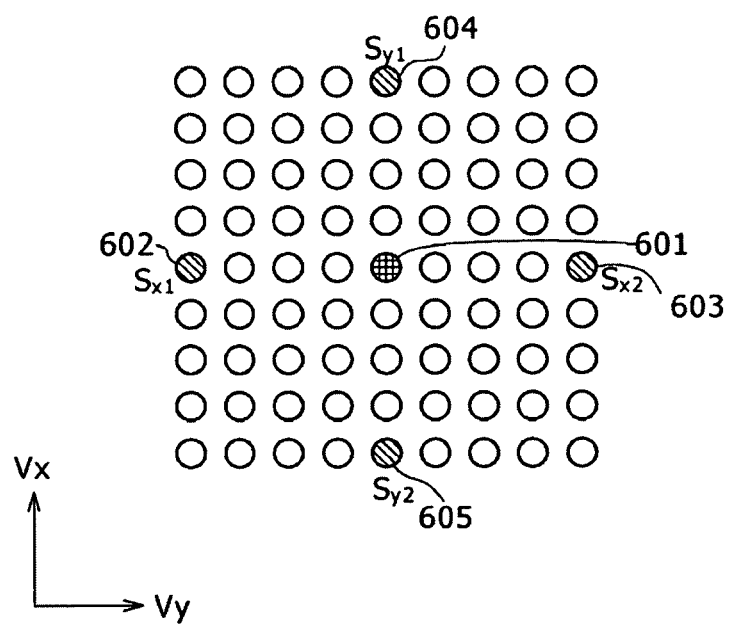
FIGS. 28 and 29 are diagrammatic views illustrating another example of processing of determining local motion vectors detected using the image processing method.

Accordingly, it is a possible idea to carry out, where the lowest SAD value 601 on the reduction plane is determined as seen in FIG. 28, an interpolation process using a plurality of SAD values in the proximity of the lowest SAD value 601, for example, using four SAD values 602, 603, 604 and 605 adjacent to the lowest SAD value 601 in the upward, downward, leftward and rightward directions, respectively, to detect a motion vector of the 4-pixel accuracy. In this instance, the interpolation magnification required is four times.

For example, it is a possible idea to use a quadratic curve to carry out interpolation for the SAD table to calculate motion vectors of the pixel accuracy from the reduction plane SAD table for which a matching process has been carried out, for example, in a unit of n pixels. In this instance, although not quadratic curve approximate interpolation but linear, cubic or higher-order curve approximate interpolation may be used, in the present example, quadratic curve approximate interpolation is used from an equilibrium between the accuracy and hardware configuration.

In the present quadratic curve approximate interpolation, as seen in FIG. 28, the lowest value Smin of the SAD value in the reduction plane SAD table indicated by a reduction plane motion vector of the n-pixel accuracy and a plurality of SAD values (hereinafter referred to as neighboring reduction plane SAD values) in the proximity of the position of the lowest value Smin, in the present example, four neighboring SAD values Sx1, Sx2 and Sy1, Sy2 adjacent the position of the lowest value Smin in the X direction or horizontal direction and the Y direction or vertical direction, are used.

Figure 29:
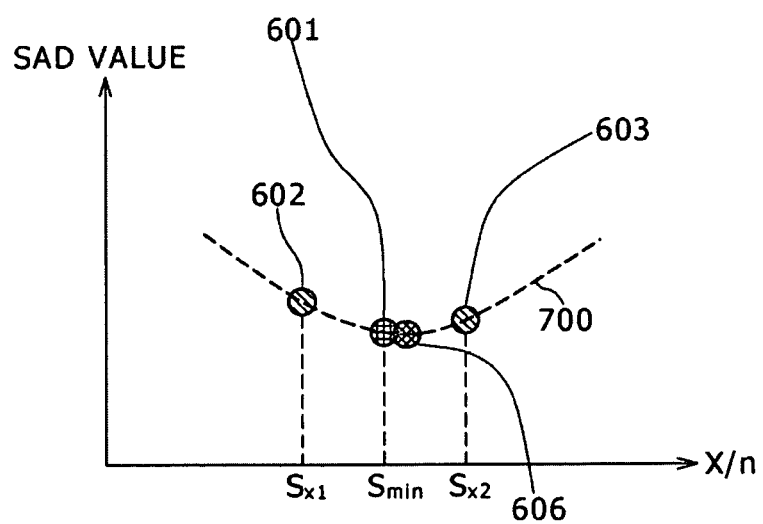

As seen in FIG. 29, the lowest value Smin of the reduction plane SAD value and the neighboring reduction plane SAD values Sx1 and Sx2 at the two adjacent points in the X direction or horizontal direction are used to apply a quadratic approximate curve 700, and the coordinate at which the approximate curve 700 assumes a minimum value becomes the X coordinate Vx of the reduction plane motion vector or high-accuracy reduction plane motion vector with which the lowest value SXmin of the SAD value of the pixel accuracy is provided. The expression for the quadratic curve approximate interpolation at this time is given as the following (expression 8):

$$SXmin = \tfrac{1}{2} \times (Sx2 - Sx1)/(Sx2 - 2Smin - Sx1) \qquad \text{(expression 8)}$$

The X coordinate on the SAD table at which the lowest value SXmin of the SAD value of the pixel accuracy determined in accordance with the calculation expression (expression 8) becomes the X coordinate Vx at which the reduction plane SAD value of the pixel accuracy assumes the lowest value.

The division in the calculation expression (expression 8) can be implemented by subtraction executed by a plural number of times. If the pixel accuracy to be used is, for example, the accuracy of one fourth the pixel pitch of the reduction plane, then the division described above can be implemented by only two times of subtraction. Therefore, the circuit scale is small and the mathematic operation time is short, and a performance very close to that by cubic curve interpolation which is considerably more complicated than quadratic approximate curve interpolation can be implemented.

Similarly, the lowest value Smin of the reduction plane SAD value and the neighboring reduction plane SAD values Sy1 and Sy2 of two points adjacent the lowest value Smin in the Y direction or vertical direction are used to apply a quadratic approximate curve, and the Y coordinate at which the quadratic curve assumes a minimum value SYmin becomes a Y coordinate Vy at which the SAD value of the pixel accuracy exhibits the lowest value. The expression for quadratic curve approximate interpolation at this time is given by the following expression (expression 9):

$$SYmin = \tfrac{1}{2} \times (Sy2 - Sy1)/(Sy2 - 2Smin + Sy1) \qquad \text{(expression 9)}$$

By carrying out approximation to a quadratic curve twice for the X direction and the Y direction in this manner, a reduction plane motion vector (Vx, Vy) of high accuracy, that is, of the pixel accuracy, is determined.

While, in the foregoing description, the lowest value of the reduction plane SAD value and reduction plane SAD values of two points adjacent the lowest value in the X direction or horizontal direction and the Y direction or vertical direction are used, the number of reduction plane SAD values adjacent in the different directions may be more than two. Further, in place of application of a quadratic curve in the X direction and the Y direction, an approximate curve may be applied, for example, in oblique directions. Further, an approximate curve may be applied in oblique directions in the X and Y directions.

Figure 30:
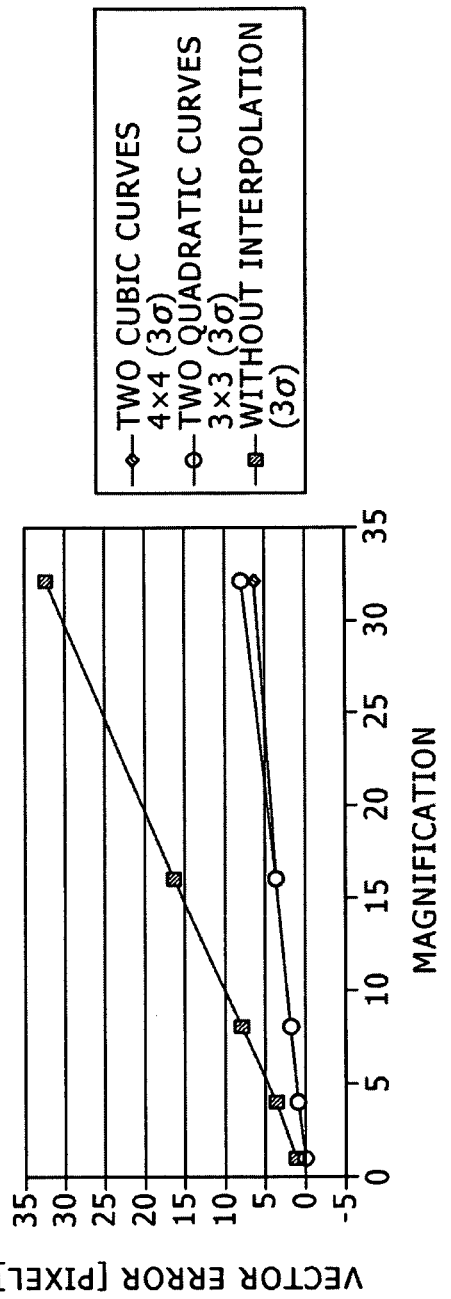
FIG. 30 is a diagrammatic view illustrating a further example of processing of determining local motion vectors detected using the image processing method.

It is illustrated in FIG. 30 that, by using such means and procedure as described above, a vector detection result of the pixel accuracy can be obtained from the values of a SAD table of the accuracy of a unit of n pixels. The axis of abscissa of FIG. 30 indicates the interpolation magnification and represents to what times the resolution should be set in a one-dimensional direction. Since the SAD table is two-dimensional, the table area decreases at a ratio of the square. However, since the error by interpolation increases only to a linear degree, the usefulness of the interpolation technique can be recognized.

Other Embodiments and Modifications

While, in the embodiments described above, the present application is applied to a case wherein the reliability of a motion vector upon image pickup of a still picture is decided, naturally the present application can be applied to another case wherein the reliability of a motion vector detected upon image pickup of moving pictures is decided.

Further, while, in the embodiments described above, a SAD value is detected as a correlation value, naturally the correlation value is not limited to the SAD value.

Further, while, in the embodiments described above, a motion detection process of a still image and a superposition process of an image are carried out for a plurality of picked up images fetched in the image memory unit 4, a plurality of images of an image pickup object may be processed on the real time basis similarly as upon image pickup of moving pictures.

It is to be noted that image information of a detection object of a motion vector is not limited to pick up image information.

Further, while, in the embodiments described above, decision of the reliability of a motion vector is carried out based on a motion vector reliability index value, not only the difference or ratio between the first maximum value of the correlation value and the second maximum value of the correlation value but also the positional difference between the reference vector which assumes the first maximum value of the correlation value and the reference vector which assumes the second maximum value of the correlation value may be used to carry out decision of the reliability. Or, a third maximum value of the correlation value or a maximum value of a higher order or else a positional distribution of reference vectors which assume such maximum values may be further referred to make a decision of the reliability.

Further, while, as regards the object for which processing is carried out using the reliability index value of a motion vector, a global motion vector is calculated from local motion vectors, the object is not limited to this.

For example, when the reliability index value of a motion vector calculated in the embodiments described above indicates that the reliability is high, it can be considered that this signifies that the motion vector has a design pattern which can be detected with high accuracy, that is, the motion has a characteristic design pattern. Accordingly, the reliability index value of a motion vector calculated in the embodiments can be applied to an application wherein a characteristic portion is extracted as contents of an image.

If image information of a management object from which a characteristic portion is to be extracted as contents of an image is image information of a plurality of images fetched by consecutive shooting, then one of images of different frames may be set as a target image or target frame while another one of the images is set as a reference image or reference frame.

Figure 31:
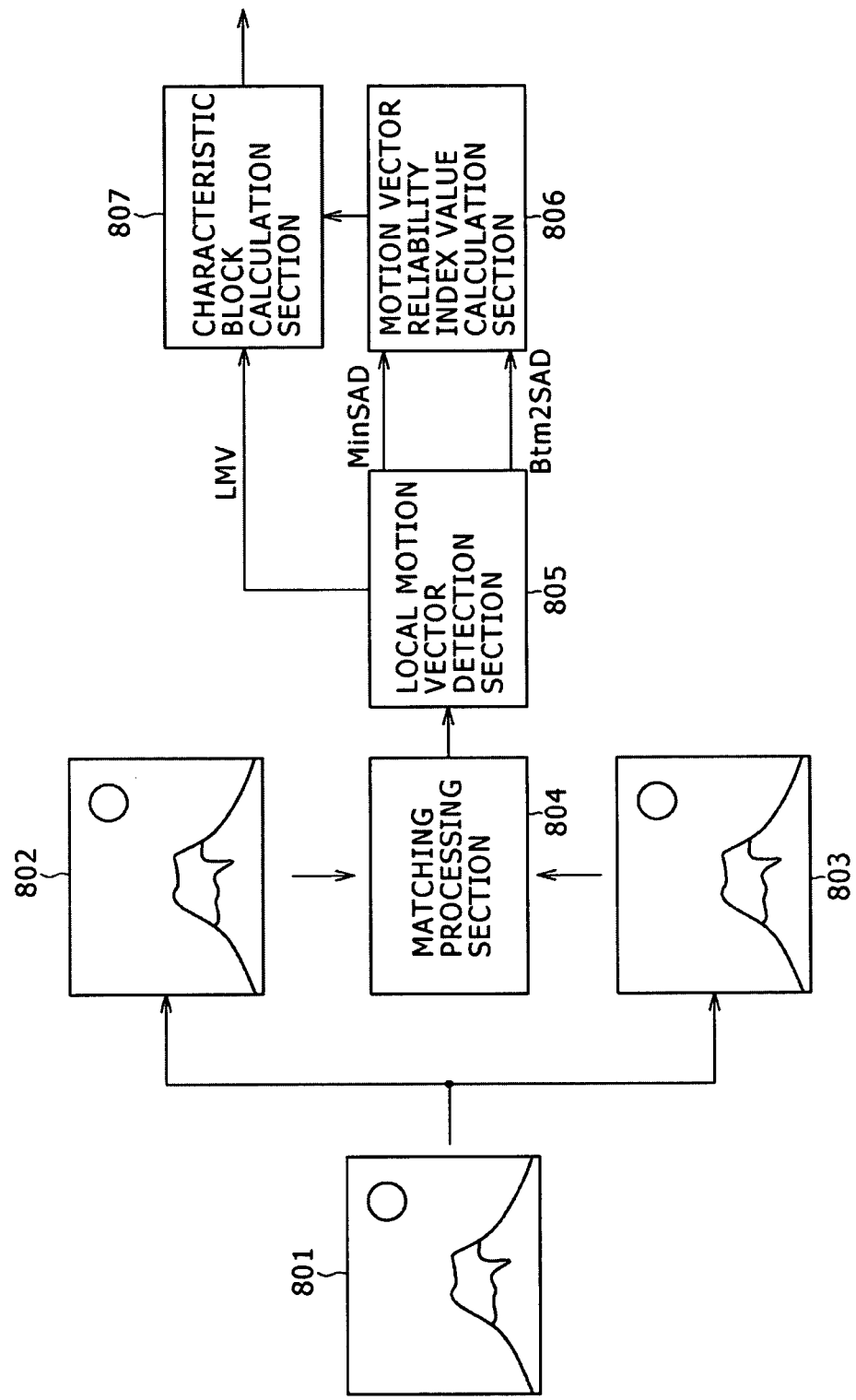
FIG. 31 is a block diagram showing part of another image processing apparatus to which in the embodiment is applied.

Further, where one still image is set as a processing object, such a countermeasure as illustrated in FIG. 31 may be adopted. In particular, an image 801 of a management object is set as a target image 802 and also as a reference image 803. Then, a matching process in a unit of a target block is executed for the target image 802 and the reference image 803 by a matching processing section 804. Here, the size of the target block is set to the size of an image portion to be extracted as a characteristic portion.

Then, an evaluation value output from the matching processing section 804, for example, a SAD value, is supplied to a local motion vector detection section 805 similarly as in the embodiments described hereinabove. The local motion vector detection section 805 detects local motion vectors LMV in a similar manner as described hereinabove and supplies the local motion vectors LMV to a characteristic block calculation section 807. Further, the local motion vector detection section 805 supplies the lowest value MinSAD and the second minimum value Btm2SAD of the SAD value to a motion vector reliability index value calculation section 806.

The motion vector reliability index value calculation section 806 calculates the motion vector reliability index values Ft of the reliability of the local motion vectors LMV in a unit of a target block and supplies the motion vector reliability index values Ft to the characteristic block calculation section 807.

The characteristic block calculation section 807 evaluates the reliability of the local motion vectors LMV for each target block based on the motion vector reliability index values Ft of the reliability of the local motion vectors LMV. Then, the characteristic block calculation section 807 outputs a characteristic block calculation result representing that a target block whose local motion vector LMV exhibits high reliability is a characteristic block.

It is to be noted that the matching processing section 804, local motion vector detection section 805 and motion vector reliability index value calculation section 806 can be configured quite similarly to the matching processing block 153, local motion vector calculation block 154 and motion vector reliability index value calculation section 156, respectively.

Accordingly, also in the case of the present example, the matching process for calculating the local motion vector LMV may be carried out only on the reduction plane or may be carried out also on the intermediate plane or the base plane.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image processing apparatus, comprising:
a processor; and
a memory device storing instructions which when executed by the processor, cause the processor to:
(a) set a plurality of reference blocks having a size equal to that of a target block which is formed with a predetermined size in a target screen image, the plurality of reference blocks being formed from a plurality of pixels within a search range that is set in a reference screen image, the reference screen image being different from the target screen image, the reference screen image including a first number pixels, the search range being set to include a second number of pixels, the second number of pixels being less than the first number of pixels;

(b) for each of the reference blocks, determine a correlation value between the target block and each of the reference blocks;

(c) determine:
(i) the highest value from among the determined correlation values; and
(ii) a maximum value from among the correlation values except the highest value;

(d) detect a motion vector of the target block as a displacement amount of the reference block with regard to which the highest value of the correlation value is calculated from the target block;

(e) calculate the difference between the highest value of the correlation value and the maximum value of the correlation values except the highest value; and (f) create an index to reliability of the detected motion vector based on the calculated difference between the highest value of the correlation value and the maximum value of the correlation values except the highest value.

2. The image processing apparatus of claim 1, wherein the index to reliability of the motion vector is determined from the value of the difference with a contrast of the target screen image taken into consideration.

3. The image processing apparatus of claim 1, wherein the instructions, when executed by the processor, cause the processor to use an image obtained by reducing an original image as the target screen image.

4. The image processing apparatus of claim 3, wherein the instructions, when executed by the processor, cause the processor to:
(a) carry out an interpolation process using the highest value of the correlation value and the correlation values determined from those of the reference blocks which are in the proximity of the block whose correlation value is the highest value; and
(b) detect the motion vector based on a result of the interpolation process.

5. The image processing apparatus of claim 1, wherein:
(a) the target block is one of target blocks into which the target screen image is divided in a horizontal direction and a vertical direction; and
(b) the instructions, when executed by the processor, cause the processor to:
(i) decide the reliability of the motion vector of each of the plural target blocks using the index to reliability; and
(ii) calculate a motion vector of the entire target screen image by using only those of the motion vectors which exhibit high reliability.

6. The image processing apparatus of claim 1, wherein:
(a) the target block is one of target blocks into which the target screen image is divided in a horizontal direction and a vertical direction; and
(b) the instructions, when executed by the processor, cause the processor to determine:
(i) the reliability of the motion vector of each of the plural target blocks using the index to reliability; and
(ii) based on a result of the decision whether or not the contents of the image of the target block are characteristic.

7. A method of operating an image processing device including instructions, the method comprising:

(a) causing a processor to execute the instructions to set a plurality of reference blocks having a size equal to that of a target block which is formed with a predetermined size in a target screen image, the plurality of reference blocks being formed from a plurality of pixels within a search range that is set in a reference screen image, the reference screen image being different from the target screen image, the reference screen image including a first number pixels, the search range being set to include a second number of pixels, the second number of pixels being less than the first number of pixels;

(b) causing the processor to execute the instructions to, for each of the reference blocks, determine a correlation value between the target block and each of the reference blocks;

(c) causing the processor to execute the instructions to determine:
(i) the highest value from among the determined correlation values; and
(ii) a maximum value from among the correlation values except the highest value;

(d) causing the processor to execute the instructions to detect a motion vector of the target block as a displacement amount of the reference block with regard to which the highest value of the correlation value is calculated from the target block;

(e) causing the processor to execute the instructions to calculate the difference between the highest value of the correlation value and the maximum value of the correlation values except the highest value; and (f) causing the processor to execute the instructions to create an index to reliability of the detected motion vector based on the calculated difference between the highest value of the correlation value and the maximum value of the correlation values except the highest value.

8. An image processing apparatus, comprising:
correlation value calculation means for:
(a) setting a plurality of reference blocks having a size equal to that of a target block which is formed with a predetermined size in a target screen image, the plurality of reference blocks being formed from a plurality of pixels within a search range that is set in a reference screen image, the reference screen image being different from the target screen image, the reference screen image including a first number pixels, the search range being set to include a second number of pixels, the second number of pixels being less than the first number of pixels; and
(b) determining, for each of the reference blocks, a correlation value between the target block and each of the reference blocks;

means for determining:
(a) the highest value from among the correlation values calculated by the correlation value calculation means; and
(b) a maximum value from among the correlation values except the highest value;

motion vector detection means for detecting a motion vector of the target block as a displacement amount of the reference block with regard to which the highest value of the correlation value is calculated from the target block; and decision means for deciding reliability of the motion vector detected by the motion vector detection means using the highest value of the correlation value and the maximum value of the correlation values except the highest value by calculating a difference between the highest value of the correlation value and the maximum value of the correlation values except the highest value.

9. A method of operating an image processing apparatus including instructions, the method comprising:
(a) causing a processor to execute the instructions to set a plurality of reference blocks having a size equal to that of a target block which is formed with a predetermined size in a target screen image, the plurality of reference blocks being and formed from a plurality of pixels within a search range that is set in a reference screen image, the reference screen image being different from the target screen image, the reference screen image including a first number pixels, the search range being set to include a second number of pixels, the second number of pixels being less than the first number of pixels;
(b) causing the processor to execute the instructions to, for each of the reference blocks, determine a correlation value between the target block and each of the reference blocks;
(c) causing the processor to execute the instructions to determine:
(i) the highest value from among the correlation values; and
(ii) a maximum value from among the correlation values except the highest value;
(d) causing the processor to execute the instructions to detect a motion vector of the target block as a displacement amount of the reference block with regard to which the highest value of the correlation value is calculated from the target block; and
(e) causing the processor to execute the instructions to decide reliability of the detected motion vector using the highest value of the correlation value and the maximum value of the correlation values except the highest value by calculating a difference between the highest value of the correlation value and the maximum value of the correlation values except the highest value.

10. An image processing apparatus, comprising:
a correlation value calculation section configured to:
(a) set a plurality of reference blocks having a size equal to that of a target block which is formed with a predetermined size in a target screen image, the plurality of reference blocks being formed from a plurality of pixels within a search range that is set in a reference screen image, the reference screen image being different from the target screen image, the reference screen image including a first number pixels, the search range being set to include a second number of pixels, the second number of pixels being less than the first number of pixels; and
(b) determine, for each of the reference blocks, a correlation value between the target block and each of the reference blocks;
a determination section configured to determine:
(a) the highest value from among the correlation values calculated by the correlation value calculation section; and
(b) a maximum value from among the correlation values except the highest value;
a motion vector detection section configured to detect a motion vector of the target block as a displacement amount of the reference block with regard to which the highest value of the correlation value is calculated from the target block;
a calculation section configured to calculate the difference between the highest value of the correlation value and the maximum value of the correlation values except the highest value; and
an index creation section configured to create an index to reliability of the detected motion vector detected by the motion vector detection section based on the calculated difference between the highest value of the correlation value and the maximum value of the correlation values except the highest value.

11. An image processing apparatus, comprising:
a correlation value calculation section configured to:
(a) set a plurality of reference blocks having a size equal to that of a target block which is formed with a predetermined size in a target screen image, the plurality of reference blocks being formed from a plurality of pixels within a search range that is set in a reference screen image, the reference screen image being different from the target screen image, the reference screen image including a first number pixels, the search range being set to include a second number of pixels, the second number of pixels being less than the first number of pixels; and
(b) for each of the reference blocks, determine a correlation value between the target block and each of the reference blocks;
a determination section configured to determine:
(a) the highest value from among the correlation values calculated by the correlation value calculation section; and
(b) a maximum value from among the correlation values except the highest value;
a motion vector detection section configured to detect a motion vector of the target block as a displacement amount of the reference block with regard to which the highest value of the correlation value is calculated from the target block;
a decision section configured to decide reliability of the motion vector detected by the motion vector detection section using the highest value of the correlation value and the maximum value of the correlation values except the highest value by calculating a difference between the highest value of the correlation value and the maximum value of the correlation values except the highest value.

12. The image processing apparatus of claim 1, further comprising determining that reliability of the motion vector is positively-related to the index to reliability when the target screen image includes at least one of a still image or a screen image.

13. The image processing apparatus of claim 1, further comprising determining a global motion vector based on the motion vector if the motion vector has a relatively high reliability based on the index to reliability.

* * * * *